US011405601B2

(12) United States Patent
McEldowney

(10) Patent No.: US 11,405,601 B2
(45) Date of Patent: Aug. 2, 2022

(54) POLARIZATION CAPTURE DEVICE, SYSTEM, AND METHOD

(71) Applicant: Facebook Technologies, LLC, Menlo Park, CA (US)

(72) Inventor: Scott Charles McEldowney, Redmond, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 17/009,338

(22) Filed: Sep. 1, 2020

(65) Prior Publication Data
US 2021/0084284 A1    Mar. 18, 2021

Related U.S. Application Data

(60) Provisional application No. 62/901,452, filed on Sep. 17, 2019.

(51) Int. Cl.
*H04N 13/239* (2018.01)
*H04N 5/225* (2006.01)
*H04N 13/257* (2018.01)
*H04N 13/15* (2018.01)
*H04N 13/00* (2018.01)

(52) U.S. Cl.
CPC ......... *H04N 13/239* (2018.05); *H04N 5/2254* (2013.01); *H04N 13/15* (2018.05); *H04N 13/257* (2018.05); *H04N 2013/0077* (2013.01); *H04N 2013/0081* (2013.01)

(58) Field of Classification Search
USPC .......................................................... 348/47
See application file for complete search history.

(56) References Cited

U.S. PATENT DOCUMENTS

| 2012/0075432 | A1  | 3/2012  | Bilbrey et al. |
| 2012/0075513 | A1* | 3/2012  | Chipman ............... G01J 4/04 348/302 |
| 2018/0100731 | A1* | 4/2018  | Pau .................. H04N 9/04555 |
| 2020/0213487 | A1* | 7/2020  | Nakata .............. H04N 9/04551 |
| 2020/0350353 | A1* | 11/2020 | Kurita ............... H04N 9/04557 |

FOREIGN PATENT DOCUMENTS

WO    2019026287 A1    2/2019

OTHER PUBLICATIONS

International Search Report and Written Opinion dated Dec. 9, 2020, in International Application No. PCT/US2020/050971, filed on Sep. 16, 2020 (8 pages).
International Preliminary Report on Patentability for International Application No. PCT/US2020/050971, dated Mar. 31, 2022, 7 pages.

* cited by examiner

*Primary Examiner* — Christopher S Kelley
*Assistant Examiner* — Ana Picon-Feliciano
(74) *Attorney, Agent, or Firm* — Millburn IP PLLC

(57) ABSTRACT

A device includes a first lens. The device also includes a first polarized image sensor coupled with the first lens and configured to capture, from a first perspective, a first set of image data in a plurality of polarization orientations. The device also includes a second lens disposed apart from the first lens. The device further includes a second polarized image sensor coupled with the second lens and configured to capture, from a second perspective different from the first perspective, a second set of image data in the plurality of polarization orientations.

19 Claims, 15 Drawing Sheets

POLARIZATION CAPTURE DEVICE, SYSTEM, AND METHOD

CROSS-REFERENCE TO RELATED APPLICATION

This application claims the benefit of priority to U.S. Provisional Patent Application No. 62/901,452, filed on Sep. 17, 2019, the entire content of which is incorporated by reference.

TECHNICAL FIELD

The present disclosure generally relates to imaging technologies and, more specifically, to a polarization capture device, system, and method.

BACKGROUND

Cameras have been widely used in a large variety of devices, such as mobile phones, augmented reality ("AR") devices, virtual reality ("VR") devices, vehicles, drones, detecting systems for various application in atmospheric science, remote sensing, facial recognition, eye-tracking, machine vision, and the like. An object may produce polarized features that are related to the nature of the object when reflecting, diffracting, transmitting, refracting, and/or scattering an incoming light. Therefore, polarization information may be used to determine various properties of the object. Polarization cameras have been used to capture images of objects including the polarization information.

SUMMARY

One aspect of the present disclosure provides a device that includes a first lens. The device also includes a first polarized image sensor coupled with the first lens and configured to capture, from a first perspective, a first set of image data in a plurality of polarization orientations. The device also includes a second lens disposed apart from the first lens. The device further includes a second polarized image sensor coupled with the second lens and configured to capture, from a second perspective different from the first perspective, a second set of image data in the plurality of polarization orientations.

Another aspect of the present disclosure provides a system. The system includes a first polarization camera configured to capture a first set of image data from a first perspective in a plurality of polarization orientations. The system also includes a second polarization camera configured to capture a second set of image data from a second perspective different from the first perspective in the plurality of polarization orientations.

Another aspect of the present disclosure provides a method. The method includes obtaining a first set of image data in a plurality of polarization orientations through a first polarization camera in a first perspective. The method also includes obtaining a second set of image data in the plurality of polarization orientations through a second polarization camera in a second perspective different from the first perspective. The method further includes determining, through a processor, multi-modal data based on the first set of image data and the second set of image data. The multi-modal data include data for a plurality of polarization color images, one or more polarization parameters, and depth information.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
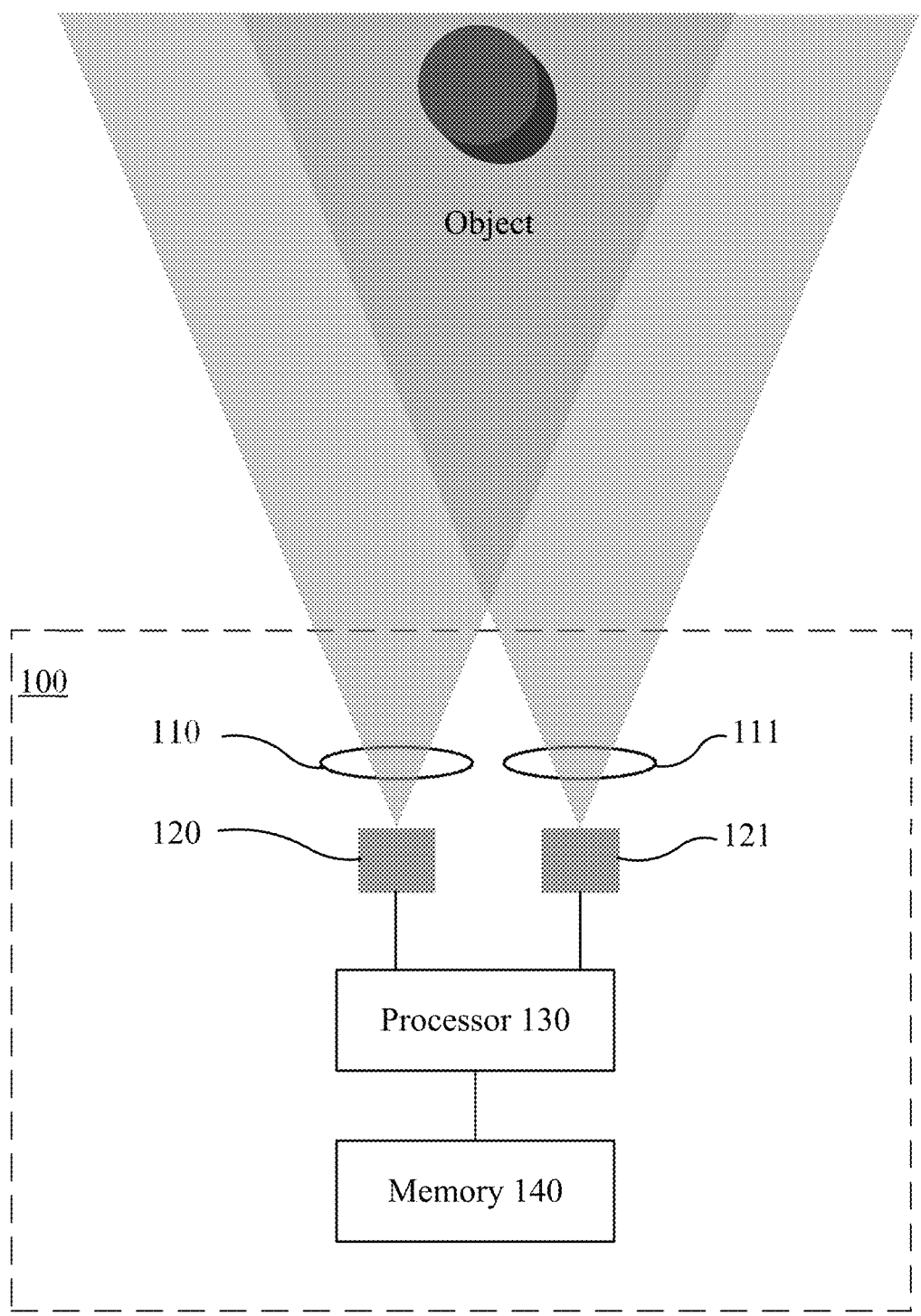
FIGS. 1A and 1B schematically illustrate a polarization capture device, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light beam output from one optical element may be directly or indirectly received by the other optical element. An optical series refers to optical positioning of a plurality of optical elements in a light beam path, such that a light beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "communicatively coupled" or "communicatively connected" indicates that related items are coupled or connected through an electrical and/or electromagnetic coupling or connection, such as a wired or wireless communication connection, channel, or network.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

The present disclosure provides a polarization capture device or system configured to capture color information, polarization information, and depth information of an object under a nature light. The polarization capture device or system may be a stereo polarization capture device or system. The stereo polarization capture system may be implemented in a large variety of devices, such as mobile phones, augmented reality ("AR") devices, virtual reality ("VR") devices, mixed reality ("MR") devices, vehicles, drones, detecting systems for various application in atmospheric science, remote sensing, facial recognition, eye-tracking, machine vision, and the like. The color information, polarization information, and depth information extracted from images of the object may be useful to realize other functions, obtain other physical properties of the object, and/or determine an operation state of the object.

Figure 1B:
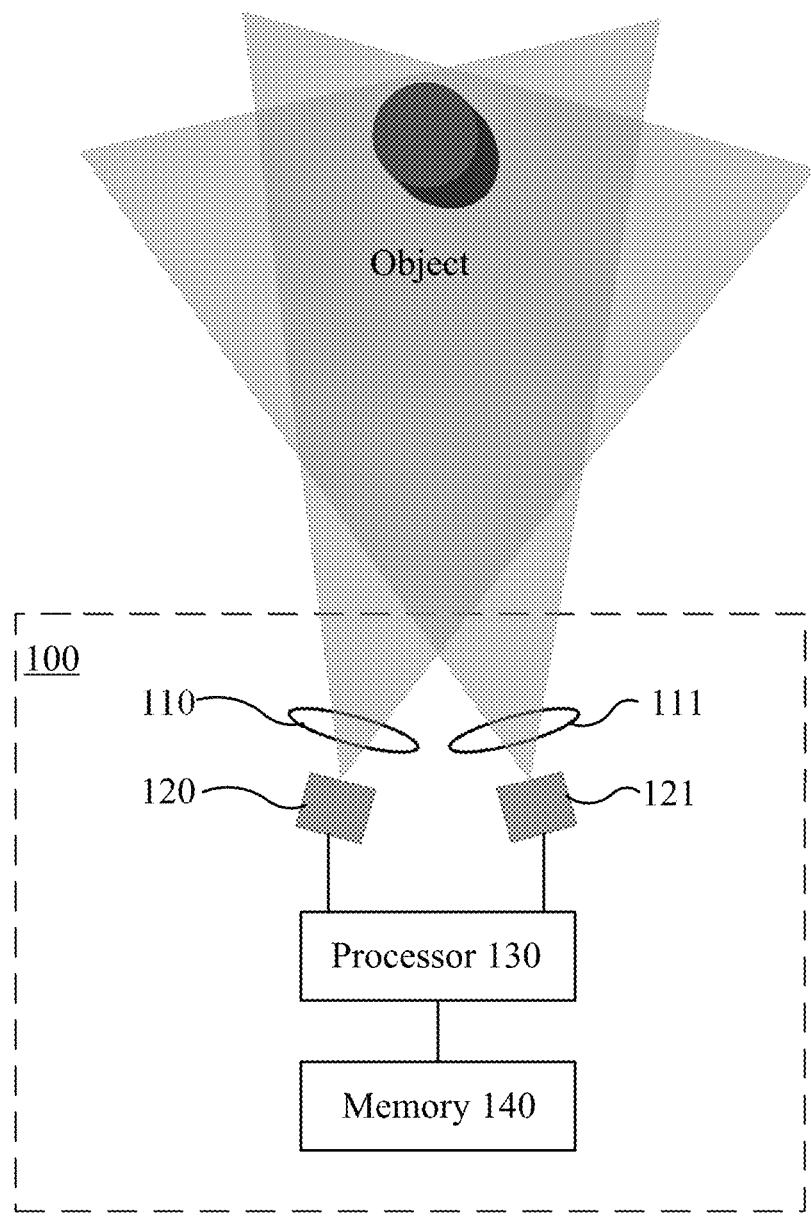

FIGS. 1A and 1B schematically illustrate a polarization capture device 100, according to an embodiment of the present disclosure. The polarization capture device 100 may be a stereo polarization capture system, which may include two or more lenses (e.g., camera lenses) and two or more polarized image sensors. For example, the stereo polarization capture device 100 may include at least two (e.g., at least a pair of) camera lenses 110 and 111 (e.g., first camera 110 and second camera 111), at least two (e.g., at least a pair of) polarized image sensors 120 and 121 (e.g., first polarized image sensor 120 and second polarized image sensor 121). In some embodiments, the first camera lens 110 and the first polarized image sensor 120 may be disposed apart, e.g., horizontally apart, from the second camera lens 111 and the second polarized image sensor 121. That is, the first camera lens 110 may be disposed side by side with the second camera lens 111. The first polarized image sensor 120 may be disposed side by side with the second polarized image sensor 121. The first polarized camera sensor 120 may be coupled with the first camera lens 110 in an optical series. The second polarized camera sensor 121 may be coupled with the second camera lens 111 in an optical series. The first camera lens 110 may be configured to guide lights onto the first polarized image sensor 120, and the second camera lens 111 may be configured to guide lights onto the second polarized image sensor 121. The first camera lens 110 and the first polarized image sensor 120, and the second camera lens 111 and the second polarized image sensor 121 may be configured to capture two sets of image data representing two images (e.g., a first set of image data and a second set of image data) of an object or a scene including an object from two different perspectives (e.g., a first perspective and a second perspective different from, and non-parallel with the first perspective). The polarization capture device 100 may also include a processor 130 coupled to the first and second polarized image sensors 120 and 121. The processor 130 may be configured to process the two sets of image data captured by the first and second polarized image sensors 120 and 121. The polarization capture device 100 may include a memory 140 coupled to the processor 130. The memory 140 may be configured to store computer-executable codes or instructions.

The first camera lens 110 and the second camera lens 111 may include one or more lenses. In some embodiments, the first polarized image sensor 120 may be arranged at a focal plane of the first camera lens 110. The second polarized image sensor 121 may be arranged at a focal plane of the second camera lens 111. The first and second camera lenses 110 and 111 may be fixedly attached or removably mounted to a housing of the polarization capture device 100.

In some embodiments, the first and second camera lenses 110 and 111 and the first and second polarized image sensors 120 and 121 may be integrated in a single camera. In some embodiments, the first camera lens 110 and the first polarized image sensor 120 may be arranged in a first camera, the second camera lens 111 and the second polarized image sensor 121 may be arranged in a second camera.

As shown in FIGS. 1A and 1B, the object may be illuminated by a nature light source, e.g., the sun. The first and second polarized image sensors 120 and 121 may receive incoming lights reflected, scattered, diffracted, transmitted, and/or refracted from an object from different perspectives. The reflection, scattering, diffraction, transmission, and/or refraction of lights by the object may be collectively referred to as deflection for discussion convenience. The polarization capture device 100 may be configured to process the light from the object 185. In some embodiments, as shown in FIG. 1A, optical axes of the first and second camera lenses 110 and 111 may be parallel to each other. In some embodiments, as shown in FIG. 1B, the optical axes of the first and second camera lenses 110 and 111 may be tilted with respect to each other, i.e., the optical axes may cross with each other.

As shown in FIGS. 1A and 1B, the first and second polarized image sensors 120 and 121 may be disposed apart from each other (e.g., in a horizontal direction). A distance between the first and second polarized image sensors 120 and 121 may be referred to as a baseline distance. In some embodiments, the baseline distance can be fixed (or constant). In some embodiments, the baseline distance may be adjustable to satisfy requirements of different applications.

Figure 2:
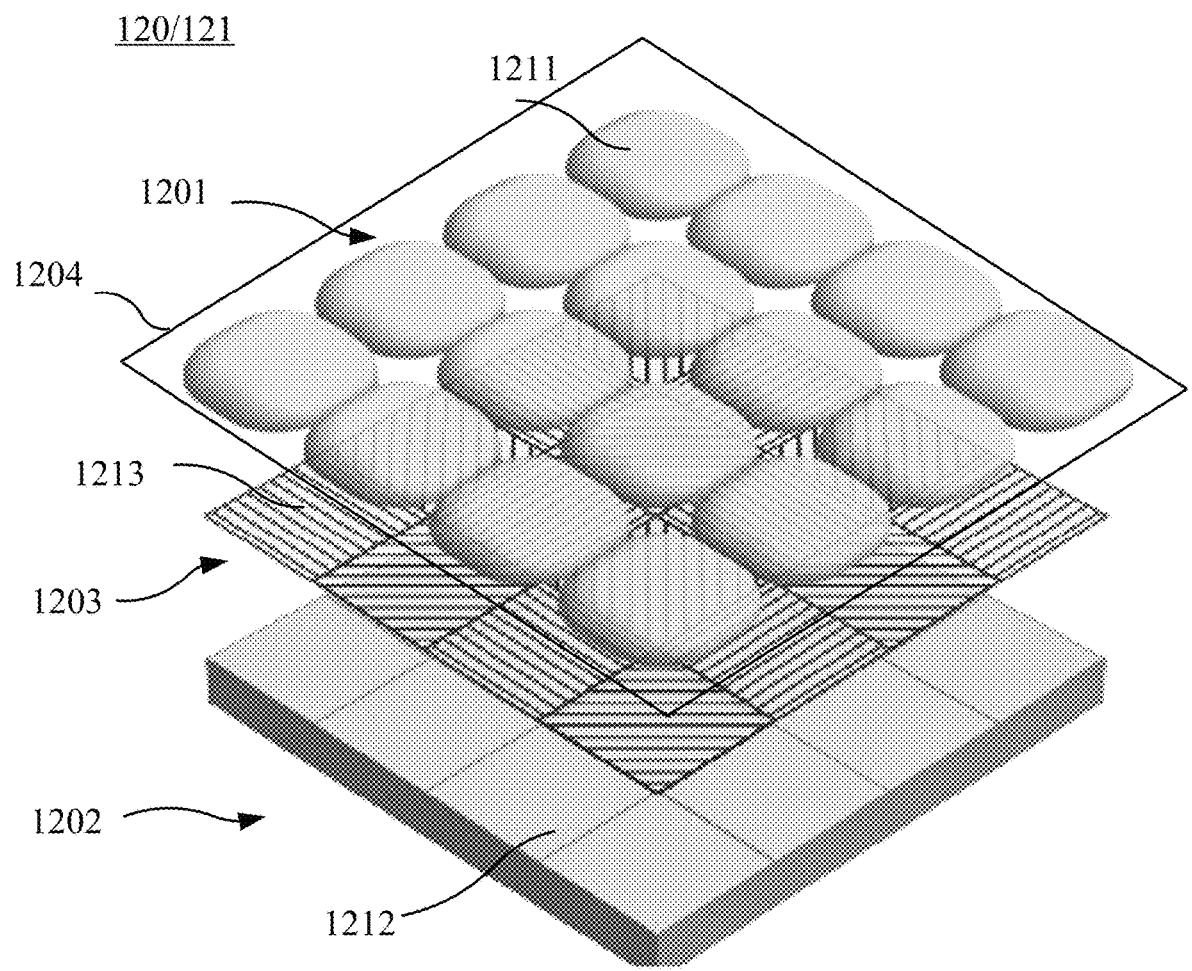
FIG. 2 schematically illustrates a structure of a polarized image sensor, according to an embodiment of the present disclosure.

FIG. 2 schematically illustrates a structure of a polarized image sensor, which may be an embodiment of the first and second polarized image sensors 120 and 121, according to an embodiment of the present disclosure. As shown in FIG. 2, the polarized image sensor 120 (or 121) may include a microlens array 1201 arranged at a top layer of the polarized image sensor 120 (or 121), a pixel array 1202 arranged at a bottom layer of the polarized image sensor 120 (or 121), and a polarizer array 1203 disposed between the microlens array 1201 and the pixel array 1202. The microlens array 1201 may be located closer to the camera lens 110 (or 111) than the pixel array 1202 and the polarizer array 1203. The microlens array 1201 may include a plurality (or array) of micro lenses 1211. The pixel array 1202 may include a plurality (or array) of photosensors 1212, such as photodiodes. In some embodiments, the polarized image sensor 120 (or 121) may further include a cover (e.g., a glass cover) arranged on the microlens array 1201 to protect the microlens array 1201 from dust or being scratched. The microlens array 1201, the polarizer array 1203, and the pixel array 1202 may be optically coupled (e.g., arranged in a stacked configuration in an optical series). In some embodiments, an incoming light may sequentially propagate through the microlens array 1201, the polarizer array 1203, and the pixel array 1202.

The polarizer array 1203 may include a plurality (or array) of polarizers arranged in a repeating pattern. The plurality of polarizers may have different transmission axis (or polarization axis) orientations. The plurality of polarizers may be configured to filter an incoming light based on a polarization orientation of the incoming light and the transmission axis orientations of the polarizers. A polarization orientation of the incoming light refers to an orientation of oscillations of an electrical field of the incoming light perpendicular to a propagating direction of the incoming light. Each of the plurality of polarizers may be configured to allow an incoming light of a predetermined polarization orientation to transmit through. The plurality of polarizers may include, but are not limited to, dichromic polarizers, crystalline polarizers, wire grid polarizers, or the like. In some embodiments, the polarizer array 1203 may include nano wire-grid polarizers coated with an anti-reflection material that suppresses flaring and ghosting. The incoming light may be filtered by the polarizer array 1203 based on the polarization orientation before being received by the pixel array 1202. As such, the polarized image sensors 120 and 121 may output two sets of image data, each set of image data associated with a plurality of polarization orientations.

The two sets of image data output from the polarized image sensors 120 and 121 may represent two images.

Figure 3:
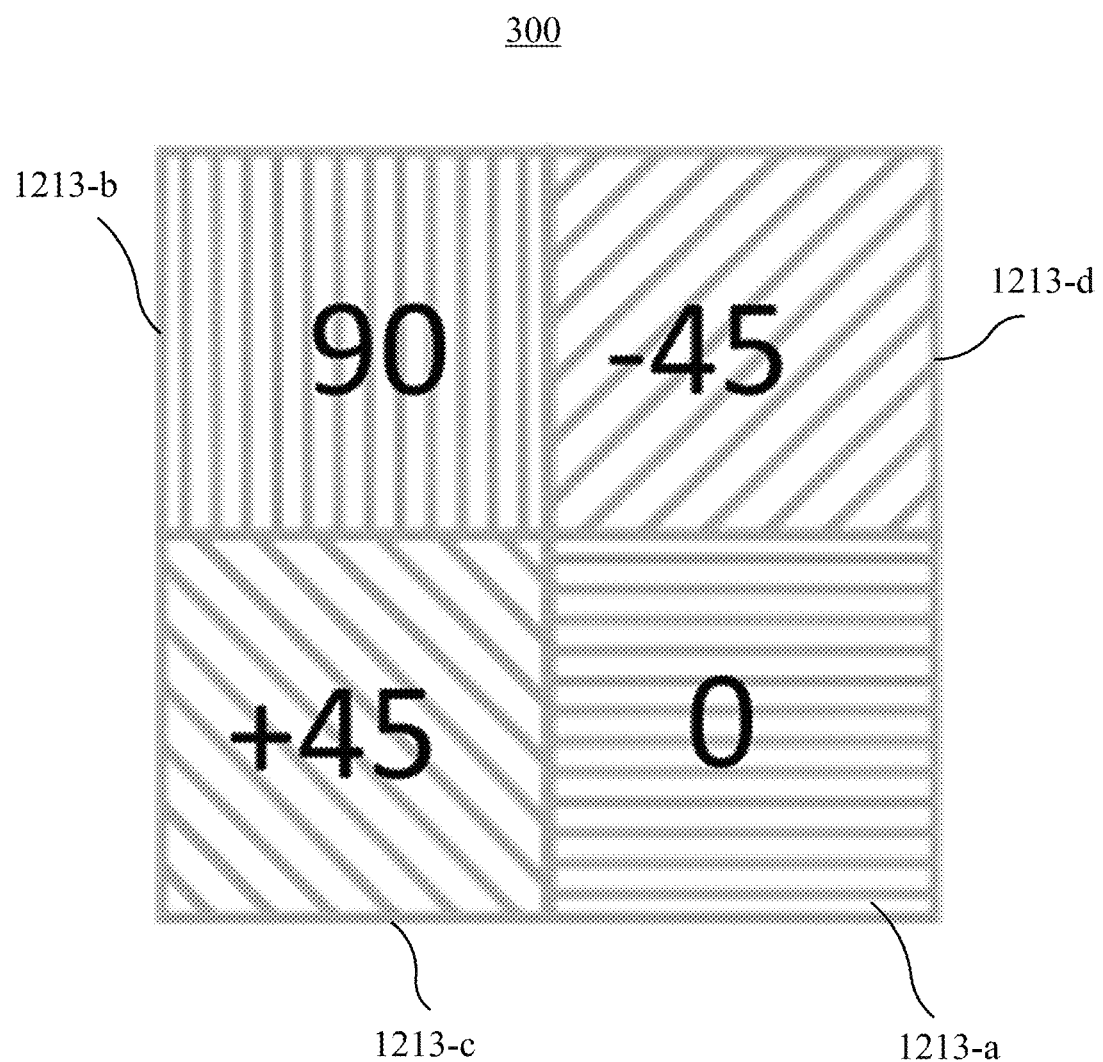
FIG. 3 schematically illustrates an example pattern of a polarizer array, according to an embodiment of the present disclosure.

FIG. 3 illustrates an example repeating pattern 300 of the polarizer array 1203, according to an embodiment of the present disclosure. The polarizer array 1203 may include any suitable number of the repeating patterns 300. The repeating pattern 300 may include four different polarizers associated with four different polarization axis orientations (e.g., 90°, 45°, 135° (or −45°), and 0°) corresponding to four pixels in the pixel array 1202, respectively. In the embodiment shown in FIG. 3, the repeating pattern 300 may include a linear horizontal polarizer (i.e., 0-degree polarizer) 1213-*a*, a linear vertical polarizer (i.e., 90-degree polarizer) 1213-*b*, a linear 45-degree polarizer 1213-*c*, and a linear 135-degree polarizer (or a −45-degree polarizer) 1213-*d* arranged side by side in a 2×2 array. The linear horizontal polarizer (i.e., 0-degree polarizer) 1213-*a* may be configured to allow an incoming light having a horizontal polarization orientation (i.e., 0° polarization orientation) to transmit through. The linear vertical polarizer (i.e., 90-degree polarizer) 1213-*b* may be configured to allow an incoming light having a vertical polarization orientation (i.e., 90° polarization orientation) to transmit through. The linear 45-degree polarizer 1213-*c* may be configured to allow an incoming light having a 45° polarization orientation to transmit through. The linear 135-degree polarizer (or a −45-degree polarizer) 1213-*d* may be configured to allow an incoming light having a 135° polarization orientation (i.e., −45° polarization orientation) to transmit through. That is, the repeating pattern 300 in the 2×2 array format may correspond to a four-pixel area (e.g., a 2×2 pixel array) in the pixel array 1202.

FIG. 3 merely shows one example layout of the repeating pattern 300 in the 2×2 array format, in which the linear vertical polarizer 1213-*b* is arranged at an upper-left pixel, the linear horizontal polarizer 1213-*a* is arranged at a lower-right pixel, the 135° (or −45°) linear polarizer 1213-*d* is arranged at an upper-right pixel, and the 45° linear polarizer 1213-*c* is arranged at a lower-left pixel. In other embodiments, the polarizers 1213-*a*, 1213-*b*, 1213-*c*, and 1213-*d* may be arranged in any other suitable layout.

In some embodiments, as shown in FIG. 2, the polarized image sensor 120 (or 121) may further include a color filter array 1204 configured to obtain a plurality of polarization color images. In some embodiments, the color filter array 1204 may be disposed between the microlens array 1201 and the polarizer array 1203. In some embodiments, the color filter array 1204 may be disposed between the polarizer array 1203 and the pixel array 1202. The color filter array 1204 may include a plurality of color filters arranged in a predetermined color filter pattern. The color filters may include, for example, a red color ("R") filter, a green color ("G") filter, and a blue color ("B") filter. The predetermined color filter pattern may be a Bayer filter pattern (e.g., BGGR, RGBG, GRGB, or RGGB). For example, the Bayer filter pattern may have a 2×2 array format. The microlens array 1201, the pixel array 1202, the polarizer array 1203, and the color filter array 1204 may have the same number of 2×2 arrays.

Figure 4:
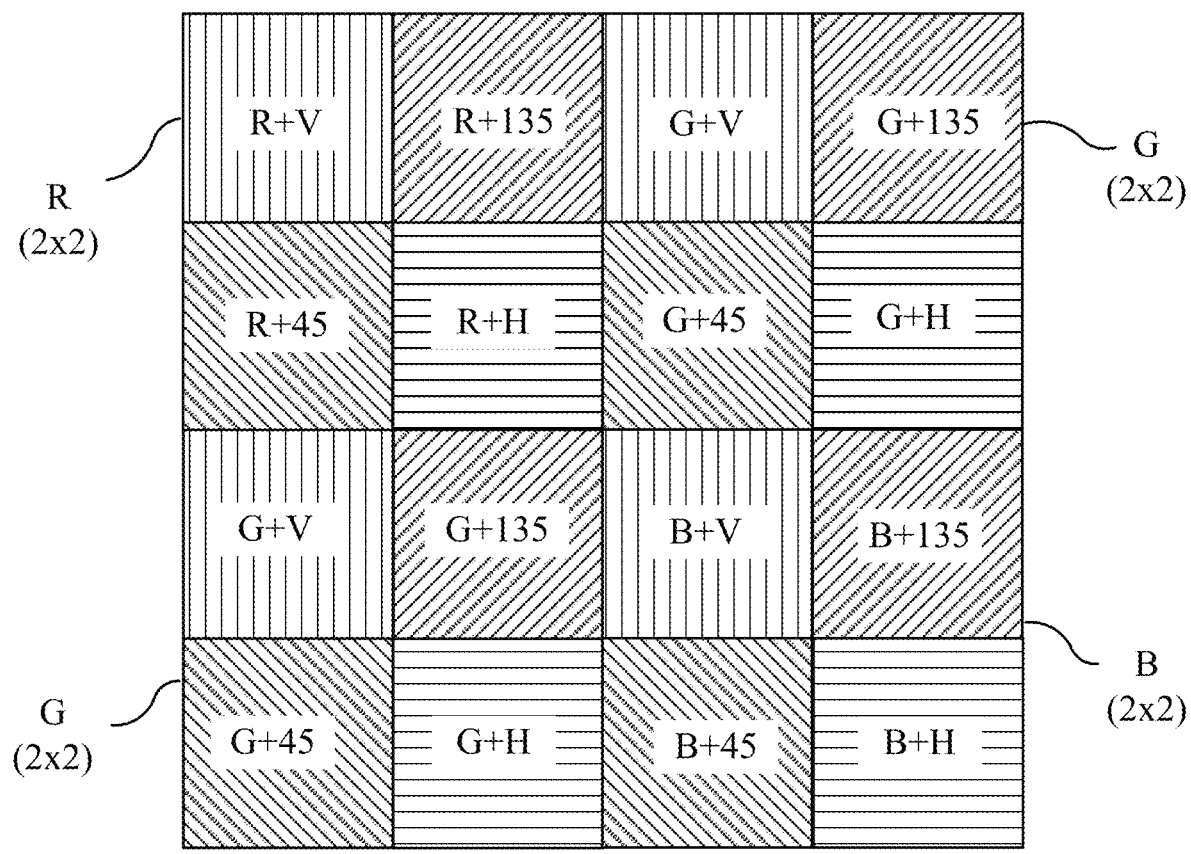
FIG. 4 schematically illustrates an image processing unit, according to an embodiment of the present disclosure.

FIG. 4 illustrates an image processing unit 400, according to an embodiment of the present disclosure. The image processing unit 400 may be included in the first and second polarized image sensors 120 and 121. The image processing unit 400 may include a layer of a polarizer array (e.g., polarizer array 1203) and a layer of color filter array (e.g., color filter array 1204). FIG. 4 shows an schematic illustration of the two layers combined together. The combination of the layer of the polarizer array and the layer of the color filter array may be stacked as shown in FIG. 2 to form a pixel filter array. That is, the polarizer array 1203 and the color filter array 1204 may form a pixel filter array. The polarizer array 1203 may include a plurality of repeating patterns 300 shown in FIG. 3. The color filter array may include a suitable number of Bayer filter patterns. As shown in FIG. 4, an RGGB Bayer filter may be combined with a number of repeating 2×2 polarizer array to form a 16-pixel image processing unit 400. In FIG. 4, "R+H" represents a pixel filter formed by a stacked combination of a red color ("R") filter and a horizontal polarizer, "R+V" represents a pixel filter formed by a stacked combination of an R color filter and a vertical polarizer, "R+45" represents a pixel filter formed by a stacked combination of an R color filter and a 45° polarizer, "R+135" represents a pixel filter formed by a stacked combination of an R color filter and a 135° polarizer, "G+H" represents a pixel filter formed by a stacked combination of a green color ("G") filter and a horizontal polarizer, "G+V" represents a pixel filter formed by a stacked combination of a G color filter and a vertical polarizer, "G+45" represents a pixel filter formed by a stacked combination of a G color filter and a 45° polarizer, "G+135" represents a pixel filter formed by a stacked combination of a G color filter and a 135° polarizer, "B+H" represents a pixel filter formed by a stacked combination of a blue color ("B") filter and a horizontal polarizer, "B+V" represents a pixel filter formed by a stacked combination of a B color filter and a vertical polarizer, "B+45" represents a pixel filter formed by a stacked combination of a B color filter and a 45° polarizer, and "B+135" represents a pixel filter formed by a stacked combination of a B color filter and a 135° polarizer.

For the image processing unit 400, the image data including an R value from the horizontal polarizer, an R value from the vertical polarizer, an R value from the 45° polarizer, an R value from the 135° polarizer, two G values from the horizontal polarizer, two G values from the vertical polarizer, two G values from the 45° polarizer, two G values from the 135° polarizer, a B value from the horizontal polarizer, a B value from the vertical polarizer, a B value from the 45° polarizer, and a B value from the 135° polarizer.

Referring back to FIGS. 1A and 1B, the processor 130 may be further configured to construct a plurality of polarization color images based on the image data from the plurality of pixel filters (combinations of the polarizer array and the color filter array). In some embodiments, the processor 130 may be configured to construct two sets of polarization color images from the two sets of image data captured by the polarization image sensors 120 and 121. That is, a first set of polarization color images may be constructed based on the first set of image data captured by a first image processing unit (an embodiment of the image processing unit 400) included in the first polarization image sensor 120 and a second set of polarization color images may be constructed based on the second set of image data captured by a second image processing unit (an embodiment of the image processing unit 400) included in the second polarization image sensor 121. In some embodiments, the processor 130 may be configured to construct one of the first set or the second set of polarization color images based on the image data captured by one of the first polarization image sensor 120 or the second polarization image sensor 121.

Figure 5A:
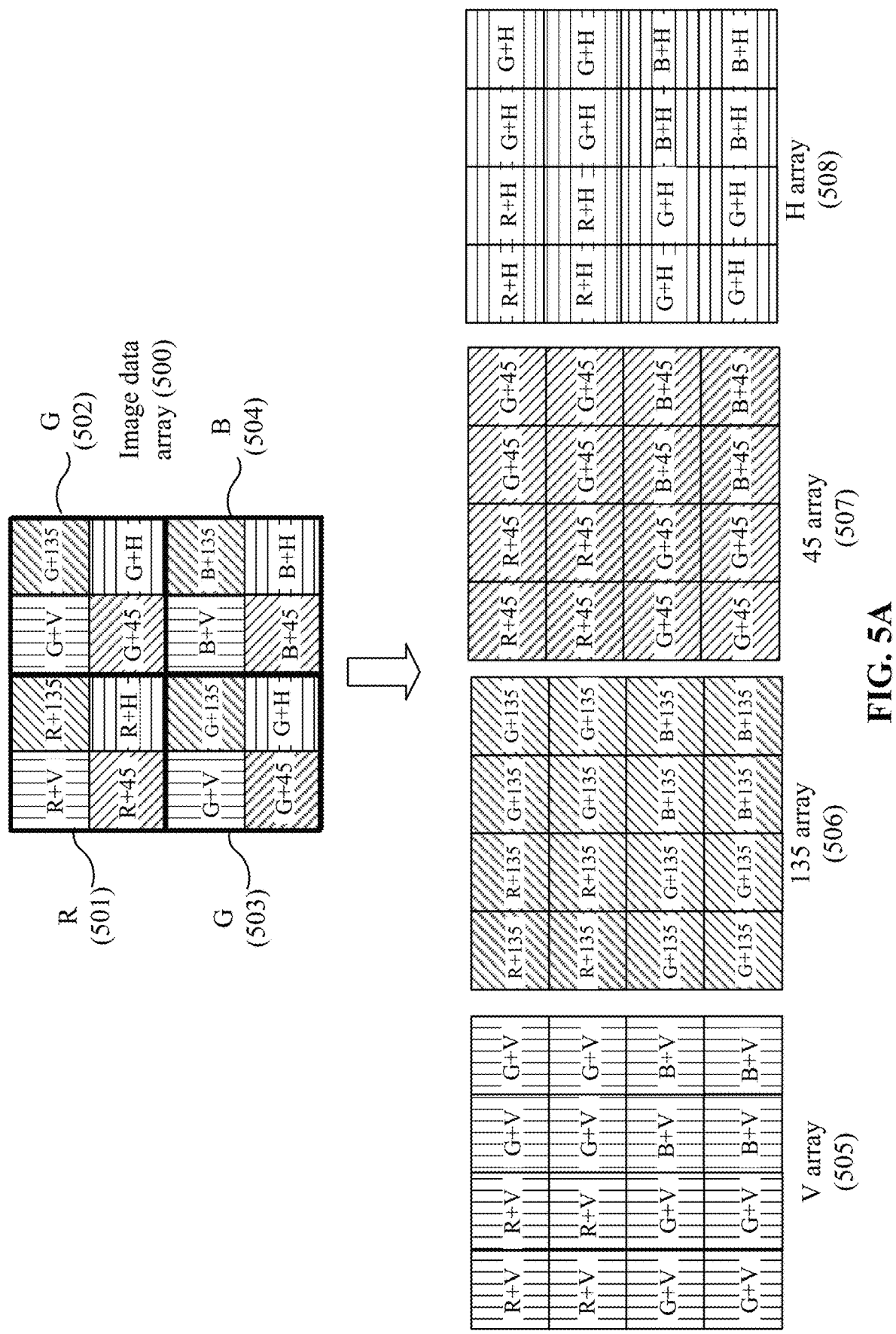
FIGS. 5A and 5B illustrate steps of a method of constructing a plurality of polarization color images, according to an embodiment of the present disclosure.

FIG. 5A illustrates a method of converting a set of original image data (e.g., raw image data) 500 to polarization image data with polarization interpolation, according to an embodiment of the present disclosure. The image data 500 may be obtained by any of the polarization image sensors 120 and 121. As shown in FIG. 5A, each pixel may capture a single color value (either R, G, or B value) through a single one of the polarizers associated with a predetermined polarization orientation, as shown in FIG. 3. The processor 130 may be configured to obtain polarization image data corresponding to each polarization orientation based on and from the raw RGB image data via polarization interpolation. One of the polarization interpolation methods is a nearest neighbor method. According to the nearest neighbor method, for a pixel with missing image data, image data of a nearest neighboring pixel may be used as the missing image data. As such, polarization image data corresponding to each polarization orientation may be obtained. As shown in FIG. 5A, raw RGB image data (in the form of an array) 500 may be processed with the polarization interpolation to obtain polarization image data for each polarization orientation, e.g., polarization image data 505 for the vertical polarization orientation (represented by a "V array"), polarization image data 506 for the 135° polarization orientation (represented by a "135 array"), polarization image data 507 for the 45° polarization orientation (represented by a "45 array"), and polarization image data 508 for the horizontal polarization orientation (represented by an "H array").

In addition to the nearest neighbor method, the interpolation algorithm may be other methods, such as, for example, bilinear interpolation, bicubic interpolation, bicubic spline interpolation, gradient-based interpolation, residual interpolation, Newton's polynomial interpolation algorithms, etc. The interpolation method or algorithm may be selected according to a desirable accuracy, and/or implementational and computational complexity. For example, a nearest neighbor algorithm may be used to reduce the computational burden on the processor 130 of the polarization capture device 100. In some embodiments, a residual interpolation algorithm or a Newton's polynomial interpolation algorithm may be used to achieve a high accuracy.

Figure 5B:
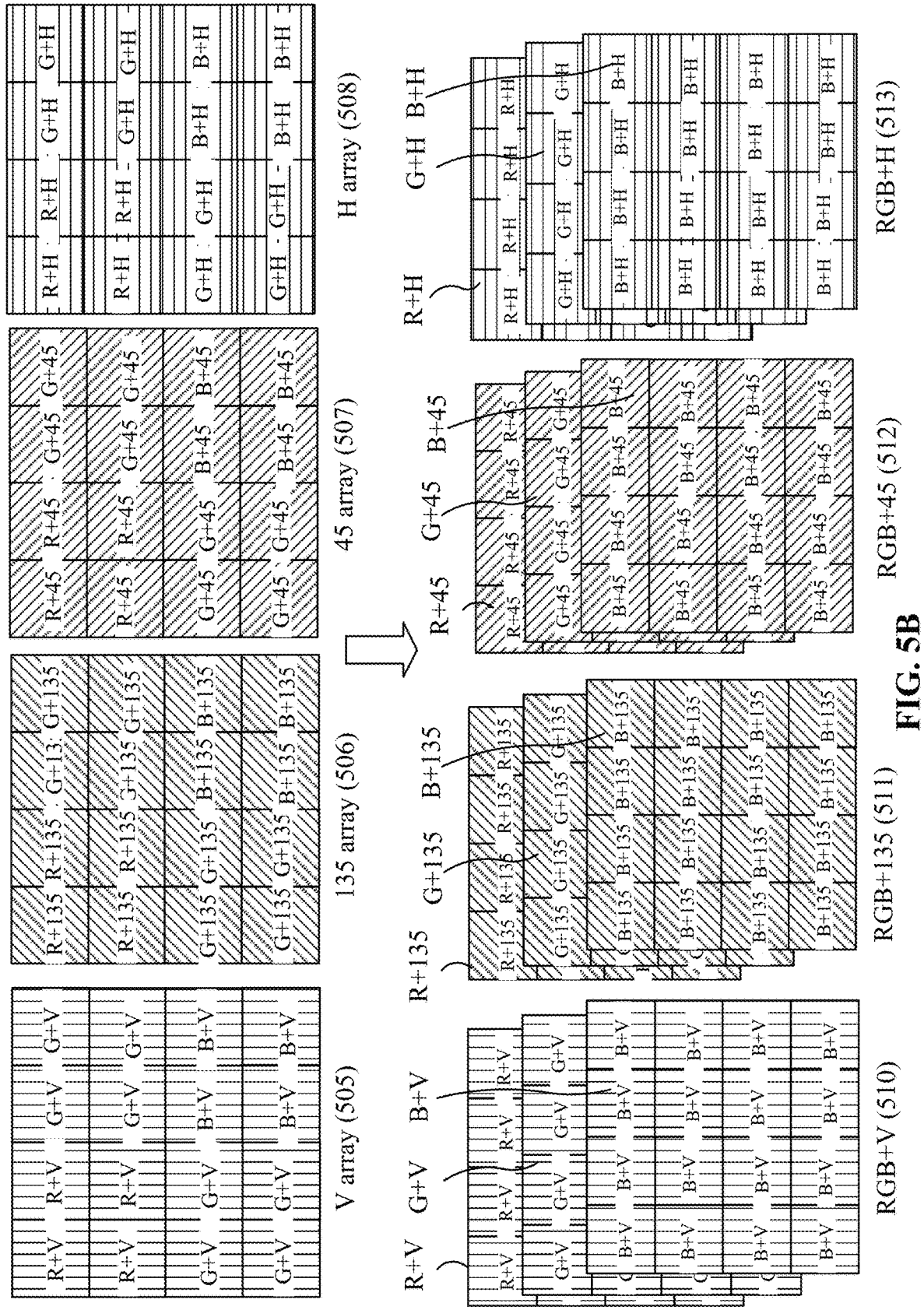

The nearest neighbor algorithm is used as an example interpolation algorithm in the following descriptions. Assuming image data (e.g., color value in a predetermined polarization orientation) for a first pixel in a 2×2 array are available, and image data for other pixels (e.g., second to fourth pixels) in the 2×2 array are not available, the first pixel for which the image data are available may serve as the nearest neighboring pixel for the remaining three pixels, and the image data for the first pixel may be duplicated and used as image data for the remaining pixels. In the 2×2 array shown in FIG. 5A, any pixel may serve as a nearest neighboring pixel for the remaining pixels. As shown in FIGS. 5A and 5B, the image data 500 may be a 4×4 pixel array, including a 2×2 pixel array 501 for the red ("R") color, a first 2×2 pixel array 502 for the green ("G") color, a second 2×2 pixel array 503 for the green ("G") color, and a 2×2 pixel array 504 for the blue ("B") color. For a 2×2 pixel array corresponding to each color (R, G, or B), any two neighboring pixels in the horizontal direction, vertical direction, or the diagonal direction may serve as the nearest neighboring pixels for each other. In the 2×2 pixel array 501 for R color, the only the R color value is available. The pixel array 501 may be associated with four predetermined polarization orientations (or four polarizers): vertical ("V"), 135° ("135"), 45° ("45"), and horizontal ("H"). Similarly, in the 2×2 pixel arrays 502 and 503 for G color, only G color values are available. The pixel arrays 502 and 503 may be associated with the four predetermined polarization orientations (or four polarizers). In the 2×2 pixel array 504 for B color, only the B color value is available. The pixel array 504 may be associated with the four predetermined polarization orientations (or four polarizers).

Based on the image data 500 (in the form of an array), a plurality of polarization image data 505, 506, 507, and 508 (in the form of arrays) may be obtained using polarization interpolation. For example, in each 2×2 array 501, 502, 503, or 504, the image data corresponding to one pixel (which is selected as a nearest neighboring pixel) may be duplicated and used as the image data for the remaining pixels. The process may be repeated, each time selecting one of the four pixels in each 2×2 array 501, 502, 503, or 504 as a nearest neighboring pixel to obtain the polarization image data 505, 506, 507, and 508.

For example, to obtain the polarization image data 505, in each 2×2 array 501, 502, 503, and 504, the upper left pixel is selected as the nearest neighboring pixel for the remaining three pixels in the 2×2 array, and the image data for the selected pixel are duplicated and used for the remaining three pixels. In this example, in the "R" 2×2 array 501, the image data for the "R+V" pixel may be duplicated and used for the remaining three pixels. In each of the two "G" 2×2 arrays 502 and 503, the image data for the "G+V" pixel may be duplicated and used for the remaining three pixels in each "G" 2×2 array. In the "B" 2×2 array 504, the image data array for the "B+V" pixel may be duplicated and used for the remaining three pixels. As a result, the "V" polarization image data 505 (in the form of an array) may be obtained. In the "V" polarization image data 505, the "R" 2×2 array 501 has the same image data corresponding to the "R+V" pixel for all pixels, the "G" 2×2 arrays 502 and 503 have the same image data corresponding to the "G+V" pixel for all pixels, and the "B" 2×2 array 504 has the same image data corresponding to the "B+V" pixel for all pixels.

To obtain the polarization image data 506, in each 2×2 array 501, 502, 503, and 504, the upper right pixel is selected as the nearest neighboring pixel for the remaining three pixels in the 2×2 array, and the image data for the selected pixel are duplicated and used for the remaining three pixels. In this example, in the "R" 2×2 array 501, the image data for the "R+135" pixel may be duplicated and used for the remaining three pixels. In the "G" 2×2 arrays 502 and 503, the image data for the "G+135" pixel may be duplicated and used for the remaining three pixels. In the "B" 2×2 array 504, the image data for the "B+135" pixel may be duplicated and used for the remaining three pixels. As a result, the "135" polarization image data 506 (in the form of an array) may be obtained. In the "135" polarization image data 506, the "R" 2×2 array 501 has the same image data corresponding to the "R+135" pixel for all pixels, the "G" 2×2 arrays 502 and 503 have the same image data corresponding to the "G+135" pixel for all pixels, the "B" 2×2 array 504 has the same image data corresponding to the "B+135" pixel for all pixels.

To obtain the polarization image data 507, in each 2×2 array 501, 502, 503, and 504, the lower left pixel is selected as the nearest neighboring pixel for the remaining three pixels in the 2×2 array, and the image data for the selected pixel are duplicated and used for the remaining three pixels. In this example, in the "R" 2×2 array 501, the image data for the "R+45" pixel may be duplicated and used for the remaining three pixels. In the "G" 2×2 arrays 502 and 503, image data for the "G+45" pixel may be duplicated and used for the remaining three pixels. In the "B" 2×2 array 504, image data for the "B+45" pixel may be duplicated and used for the remaining three pixels. As a result, the "45" polarization image data 507 (in the form of an array) may be obtained. In the "45" polarization image data 507, the "R"

2×2 array 501 has the same image data corresponding to the "R+45" pixel for all pixels, the "G" 2×2 arrays 502 and 503 have the same image data corresponding to the "G+45" pixel for all pixels, the "B" 2×2 array 504 has the same image data corresponding to the "B+45" pixel for all pixels.

To obtain the polarization image data 508, in each 2×2 array 501, 502, 503, and 504, the lower right pixel is selected as the nearest neighboring pixel for the remaining three pixels in the 2×2 array, and the image data for the selected pixel are duplicated and used for the remaining three pixels. In this example, in the "R" 2×2 array 501, image data for the "R+H" pixel may be duplicated and used for the remaining three pixels. In the "G" 2×2 arrays 502 and 503, image data for the "G+H" pixel may be duplicated and used for the remaining three pixels. In the "B" 2×2 array 504, image data for the "B+H" pixel may be duplicated and used for the remaining three pixels. As a result, the "H" polarization image data 508 (in the form of an array) may be obtained. In the "H" polarization image data 508, the "R" 2×2 array 501 has the same image data corresponding to the "R+45" pixel for all pixels, the "G" 2×2 arrays 502 and 503 have the same image data corresponding to the "G+45" pixel for all pixels, the "B" 2×2 array 504 has the same image data corresponding to the "B+45" pixel for all pixels.

As shown in FIG. 5B, the processor 130 may be configured to construct a plurality of polarization color images 510, 511, 512, and 513 based on the corresponding polarization image data using color interpolation. The polarization color images indicated by the data structures 510, 511, 512, and 513 may be obtained using any suitable color interpolation method, for example, the nearest neighbor, linear, cubic, cubic spline, or the like.

"RGB+H" (reference number 513) represents polarization color image data corresponding to a polarization color image in the horizontal polarization orientation, which may include three 16-pixel arrays: R+H, G+H, and B+H. In each of the pixel arrays, the image data for each pixel may be the same. For example, in the R+H pixel array, the polarization color image data for each pixel may be the same, i.e., image data corresponding to R+H (or red color in the horizontal polarization orientation). In the G+H pixel array, the polarization color image data for each pixel may be the same, i.e., image data corresponding to G+H (or green color in the horizontal polarization orientation). In the B+H pixel array, the polarization color image data for each pixel may be the same, i.e., image data corresponding to B+H (or blue color in the horizontal polarization orientation).

RGB+V (reference number 510) represents polarization color image data corresponding to a polarization color image in the vertical polarization orientation, which may include three pixel arrays: R+V, G+V, and B+V. In each of the pixel arrays, the polarization color image data for each pixel may be the same, i.e., image data associated with R+V, G+V, or B+V, respectively.

RGB+45 (reference number 512) represents polarization color image data corresponding to a polarization color image in the 45° polarization orientation, which may include three pixel arrays: R+45, G+45, and B+45. In each of the three pixel arrays, the polarization color image data for each pixel may be the same, i.e., image data associated with R+45, G+45, or B+45, respectively.

RGB+135 (reference number 511) represents polarization color image data corresponding to a polarization color image in the 135° polarization orientation, which may include three pixel arrays: R+135, G+135, and B+135. In each of the three pixel arrays, the polarization color image data for each pixel may be the same, i.e., image data associated with R+135, G+135, or B+135, respectively.

The processor 130 may be further configured to calculate one or more polarization parameters based on the plurality of polarization color images. The one or more polarization parameters may include one or more of Stokes parameters S0, S1, and S2, a degree of linear polarization ("DOLP"), and an angle of linear polarization ("AOLP"). In some embodiments, the processor 130 may be configured to calculate two sets of the polarization parameters from the two sets of the plurality of polarization color images constructed based on two sets of image data captured by the polarization image sensors 120 and 121. In some embodiments, the processor 130 may be configured to calculate the polarization parameters based on polarization color images constructed from image data captured by one of the polarization image sensors 120 and 121.

In some embodiments, the processor 130 may be configured to calculate one or more of the Stokes parameters S0, S1, and S2 based on one or more optical powers of an incoming light in the plurality of polarization orientations. The Stoke parameter S0 may be equal to a total optical power of the incoming light. In some embodiments, the Stoke parameter S0 may be calculated as a sum of an optical power of the incoming light in the horizontal polarization orientation ("$P_H$") (e.g., an optical power measured after a linear horizontal polarizer) and an optical power of the incoming light in vertical polarization orientation ("$P_V$") (e.g., an optical power measured after a linear vertical polarizer), i.e., $S0=P_H+P_V$. In some embodiments, the Stoke parameter S0 may be calculated as a sum of an optical power of the incoming light in the 45° polarization orientation ("$P_{45}$") (e.g., optical power measured after a linear+45° polarizer) and an optical power of the incoming light in the 135° polarization orientation ("$P_{135}$") (e.g., optical power measured after a linear 135° polarizer), i.e., $S0=P_{45}+P_{135}$. In some embodiments, the Stoke parameter S0 may be calculated as $S0=(P_H+P_V+P_{45}+P_{135})/2$. In some embodiments, the Stoke parameter S0 may be calculated as a maximum of $(P_H+P_V)$ and $(P_{45}+P_{135})$, i.e., $S0=\max((P_H+P_V), (P_{45}+P_{135}))$.

In some embodiments, $P_H$ may be obtained from the polarization color image RGB+H (reference number 513 in FIG. 5B), $P_V$ may be obtained from the polarization color image RGB+V (reference number 510 in FIG. 5B), $P_{45}$ may be obtained from the polarization color image RGB+45 (reference number 512 in FIG. 5B), $P_{135}$ may be obtained from the polarization color image RGB+135 (reference number 511 in FIG. 5B). For example, for each pixel, $P_H$ may be equal to a sum of $P_{R+H}$, $P_{G+H}$, and $P_{B+H}$ associated with the pixel, i.e., $P_H=P_{R+H}+P_{G+H}+P_{B+H}$. $P_V$ may be equal to a sum of $P_{R+V}$, $P_{G+V}$, and $P_{B+V}$ associated with the pixel, i.e., $P_V=P_{R+V}+P_{G+V}+P_{B+V}$. $P_{45}$ may be equal to a sum of $P_{R+45}$, $P_{G+45}$, and $P_{B+45}$ associated with the pixel, i.e., $P_{45}=P_{R+45}+P_{G+45}+P_{B+45}$. $P_{135}$ may be equal to a sum of $P_{R+135}$, $P_{G+135}$, and $P_{B+135}$ of the pixel, i.e., $P_{135}=P_{R+135}+P_{G+135}+P_{B+135}$.

The Stoke parameter 51 may be equal to a difference between $P_H$ and $P_V$, e.g., $S1=P_H-P_V$. The Stoke parameter S2 may be equal to a difference between $P_{45}$ and $P_{135}$, e.g., $S2=P_{45}-P_{135}$.

The DOLP value and AOLP value may be calculated using the following equations:

$$DOLP=\sqrt{S1^2+S2^2}/S0 \quad (1)$$

$$AOLP=\tfrac{1}{2}\arctan(S2/S1) \quad (2).$$

The DOLP value may depend on a surface condition of the object and/or an angle of reflection from the object. For example, the incoming light reflected and/or scattered from a specular surface may have a high DOLP value. As such, the DOLP value may indicate, or may be used for estimating, a surface roughness, a texture type, or surface scratch detection. In some embodiments, the DOLP value may indicate, or may be used to determine, whether an object is a natural object or a man-made object, because most natural objects are characterized by low DOLP values and most man-made objects, such as plastic objects, generally have high DOLP values. The AOLP value may provide direction information of a reflection plane of the object. Therefore, the AOLP value may be used for shape detection, distortion detection, or object recognition. In some embodiments, a degree of polarization image may be obtained by calculating the DOLP value for each pixel. An angle of polarization image may be obtained by calculating the AOLP value for each pixel. In some embodiments, the polarization information of the object may include other parameters, such as a degree of polarization ("DOP"), an angle of polarization ("AOP"), a degree of circular polarization ("DOCP"), etc.

Figures 6A, 6B, 6C:
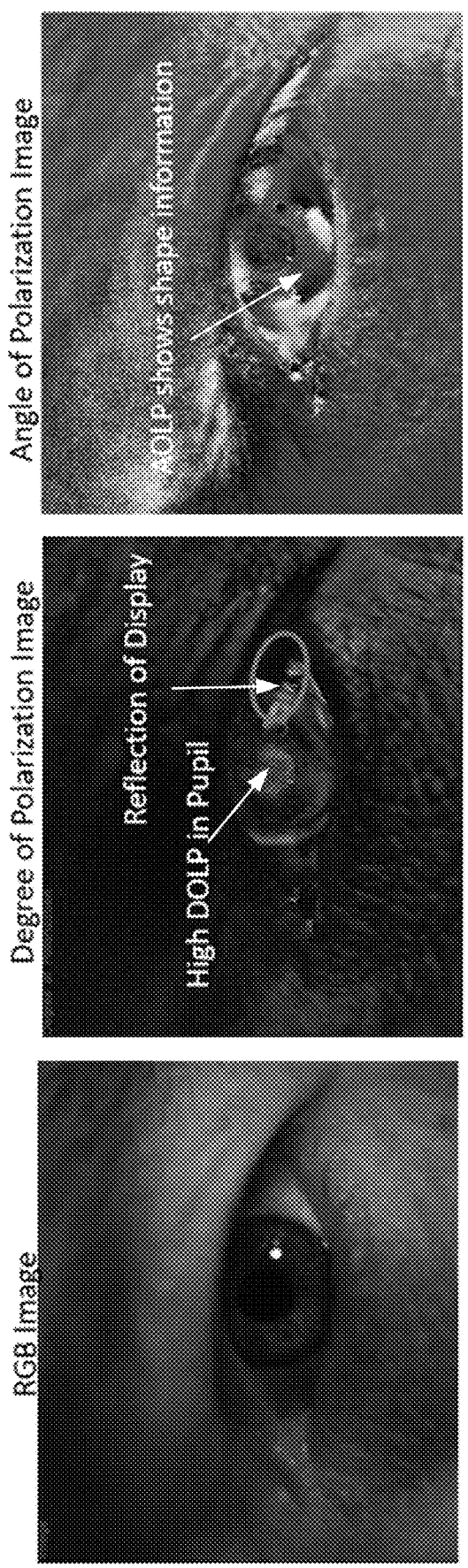
FIGS. 6A, 6B, and 6C illustrate an RGB (red, green, and blue) image of an eye, a degree of polarization image of the eye, and an angle of polarization image of the eye, respectively.

FIG. 6A illustrates an RGB image of an eye. FIG. 6B illustrates a degree of polarization image corresponding to the RGB image. FIG. 6C illustrates an angle of polarization image of an eye corresponding to the RGB image. The degree of polarization image shown in FIG. 6B refers to an image showing DOLP values of the incoming light and/or scattered by the eye. The angle of polarization image shown in FIG. 6C refers to an image showing AOLP values of the incoming light reflected and/or scattered by the eye.

Comparing the degree of polarization image shown in FIG. 6B with the RGB image shown in FIG. 6A, it can be seen that a pupil of the eye is much clearer in the degree of polarization image, because the pupil has a high DOLP value. In addition, a reflection of a display, at which the eye is looking, can be seen in the degree of polarization image shown in FIG. 6B. Shape information of the pupil can be seen in the angle of polarization image shown in FIG. 6C. Therefore, the polarization capture device 100 that can provide the DOLP and AOLP information may be implemented in eye tracking applications.

Figure 7C:
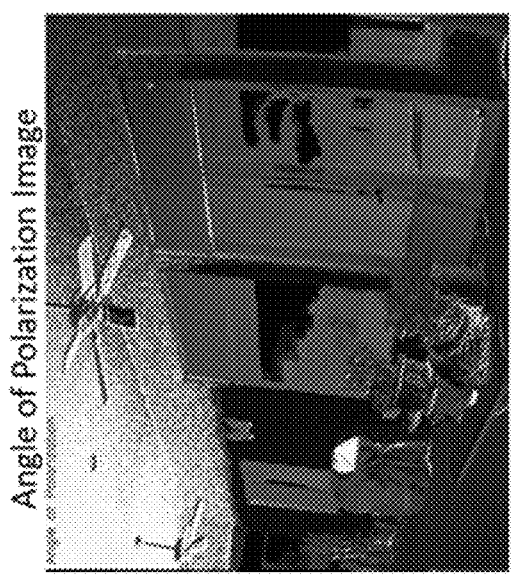
FIGS. 7A, 7B, and 7C illustrate an RGB (red, green, and blue) image of a house with windows, a degree of polarization image of the house with windows, and an angle of polarization image of the house with windows, respectively.
Figure 7B:
Figure 7A:

FIG. 7A illustrates an RGB image of a house with glass windows. FIG. 7B illustrates a degree of polarization image corresponding to the RGB image shown in FIG. 7A. FIG. 7C illustrates an angle of polarization image corresponding to the RGB image. As shown in FIG. 7B, the DOLP and AOLP information may help identify light transmitted through an object (e.g., the glass window), and light reflected and/or scattered by the object (e.g., the glass window). For example, in the degree of polarization image shown in FIG. 7B, objects inside the windows can be identified, which are not identifiable in the RGB image shown in FIG. 7A. In the angle of polarization image shown in FIG. 7C, the shapes of the fan as well as the shape of the pots become more evident.

Referring again to FIGS. 1A and 1B, the processor 130 may be configured to derive depth information of the object from two raw images (e.g., two sets of image data) captured by the polarization image sensors 120 and 121. In some embodiments, raw images may be used. A raw image (or raw image data) refers to image data captured by a polarization image sensor that include the RGB information, the polarization information, and the depth information, before the image data are processed. The depth information may be obtained based on a disparity (e.g., a binocular disparity) of the object obtained from the raw image captured by the polarization image sensor 120 and the raw image captured by the polarization image sensor 121. The disparity includes a difference in the location of the object in the raw images (or raw image data) captured by the polarization image sensor 120 and the polarization image sensor 121.

Figure 8:
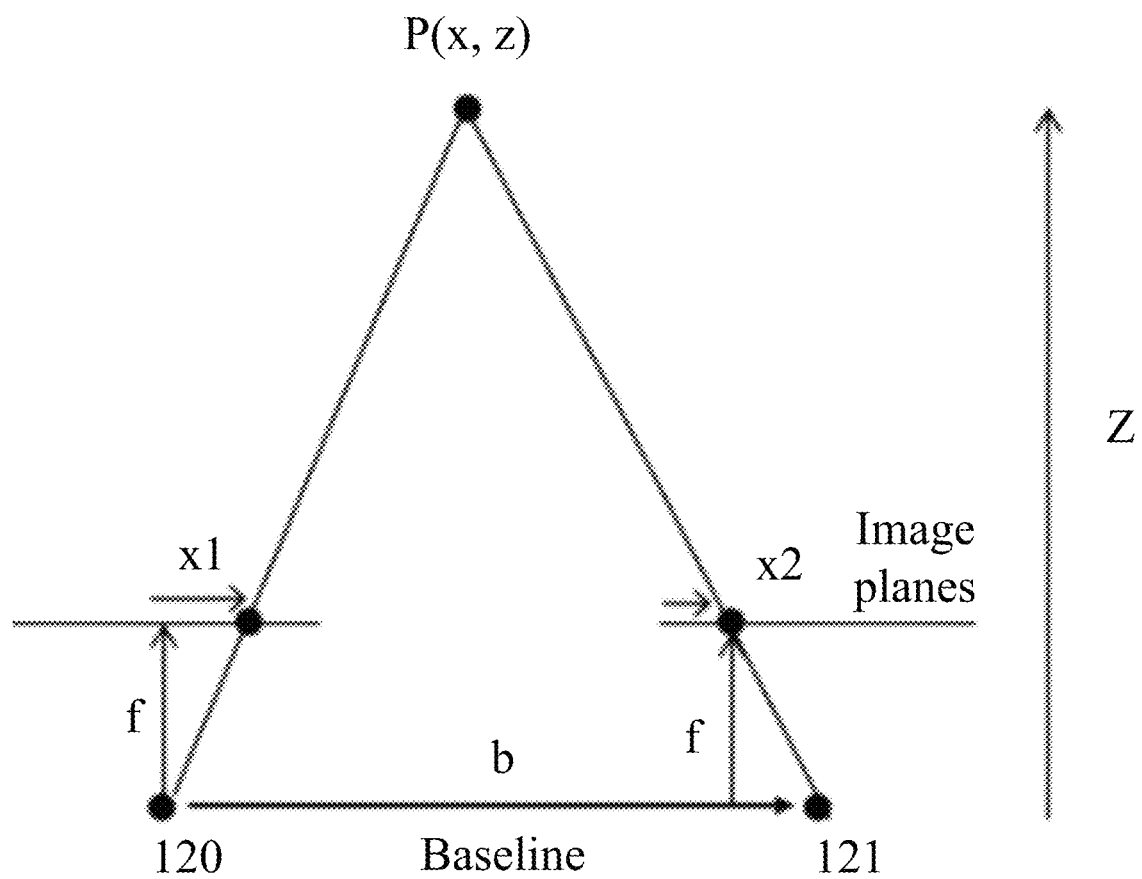
FIG. 8 schematically illustrates a method of calculating a depth of an object, according to an embodiment of the present disclosure.

FIG. 8 illustrates a method of calculating a depth of an object, according to an embodiment of the present disclosure. As shown in FIG. 8, "f" denotes a focal length of the camera lens 110/111, "b" denotes a baseline distance (i.e., the distance between the polarization image sensors 120 and 121), corresponding image points for the object are (x1, y1) and (x2, y2) in the images captured by the polarization image sensors 120 and 121. When the optical axes of the camera lenses 110 and 111 are parallel, a location (coordinates x, y, and z) of the object may be calculated according to the following equations:

$$z = f \times b / (x1 - x2) = f \times b / d \qquad (3)$$

$$x = x1 \times z/f \text{ or } b + x2 \times z/f \qquad (4)$$

$$y = y1 \times z/f \text{ or } y2 \times z/f \qquad (5)$$

where d represents disparity of the object in two images captured by the polarization image sensors 120 and 121.

The method of determining the depth from the disparity d may be referred to as triangulation. In some embodiments, the calculation of the depth information may involve a correspondence relationship between the polarization image sensors 120 and 121. The processor 130 may be further configured to determine a correspondence relationship between points (e.g., pixels) on the polarization image sensors 120 and 121. The corresponding points can be obtained by implementing, for example, cross correlation or sum of squared differences ("SSD") using small windows, symbolic feature matching, scale-invariant feature transform ("SIFT"), or the like.

Consistent with the disclosure, the stereo polarization capture device 100 may obtain the RGB images, the polarization parameters (e.g., DOLP and AOLP), and the depth information in one shot. That is, an image captured by the stereo polarization capture device 100 may include RGB information, polarization parameters, and the depth information of an object in the image. The AOLP value may provide the shape information of the object. Thus, a 3D shape of the object may be reconstructed based on the shape information and the depth information determined from the captured image (or image data). The DOLP value may provide the surface texture information of the object. Accordingly, surface texture information may be added to the reconstructed 3D object, such that the obtained 3D object may reflect the realistic state of the object. In addition, the DOLP value may be used to better distinguish the object from the background or other objects in a same scene, rendering it easier to position and track the object in the image. The polarization capture device 100 may be used in a variety of devices, such as the mobile phones, AR/VR/MR devices, vehicles, drones, detecting systems for various applications in atmospheric science, remote sensing, facial recognition, eye-tracking, and machine vision.

Referring back to FIGS. 1A and 1B, the processor 130 may include any suitable hardware processors, such as a microprocessor, a micro-controller, a central processing unit ("CPU"), a network processor ("NP"), a digital signal processor ("DSP"), an application specific integrated circuit ("ASIC"), a field-programmable gate array ("FPGA"), any other programmable logic device, discrete gate or transistor logic device, or discrete hardware component.

The memory 140 may include a non-transitory computer-readable storage medium, such as a random-access memory ("RAM"), a read only memory ("ROM"), a flash memory, a volatile memory, a hard disk storage, or an optical medium. The memory 140 may be configured to store computer-executable codes or instructions that, when executed by the processor 130, cause the processor 130 to construct the plurality of polarization color images, and calculate the polarization parameters and depth information of the object as disclosed herein. In some embodiments, the memory 140 may also be configured to store data, such as image data obtained by the polarization image sensors 120 and 121.

Figure 9:
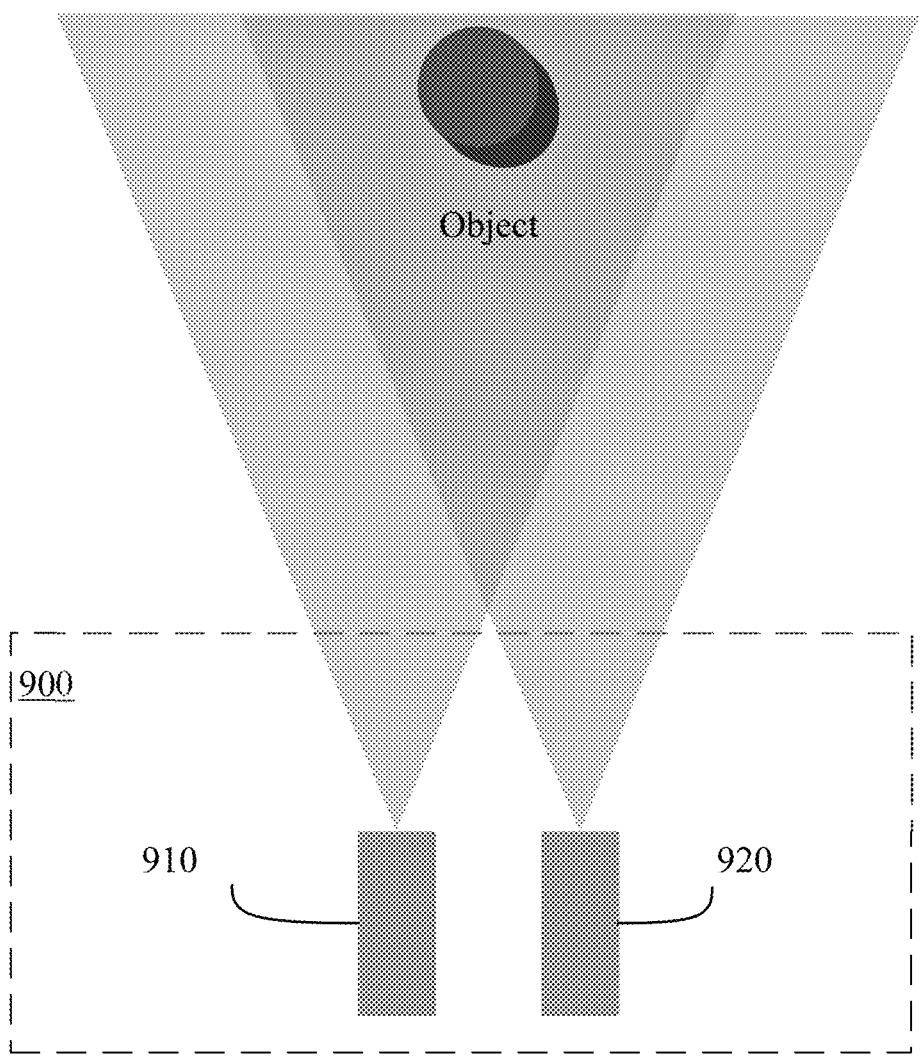
FIG. 9 schematically illustrates a polarization capture system, according to an embodiment of the present disclosure.

FIG. 9 illustrates a polarization capture system 900, according to an embodiment of the present disclosure. The polarization capture system 900 may be a stereo polarization capture system. In some embodiments, as shown in FIG. 9, the polarization capture system 900 may include two or more polarization cameras. For example, the polarization capture system 900 may include a first polarization camera 910 and a second polarization camera 920. The first polarization camera 910 and the second polarization camera 920 may also be referred to RGB/P cameras 910 and 920. The first polarization camera 910 and the second polarization camera 920 may be disposed apart from one another (e.g., in a horizontal direction). In some embodiments, the first and second polarization cameras 910 and 920 may be disposed side by side. The polarization cameras 910 and 920 may be configured to capture images from different perspectives in a plurality of polarization orientations. For example, the first polarization camera 910 may be configured to capture a first set of image data from a first perspective in the plurality of polarization orientations. The polarization camera 920 may be configured to capture a second set of image data from a second perspective different from the first perspective, in the plurality of polarization orientations. In some embodiments, each of the polarization cameras 910 and 920 may include a camera lens (e.g., 110 or 111) and a polarized image sensor (e.g., 120 or 121) optically coupled to the camera lens, as disclosed herein. In some embodiments, at least one (e.g., each) of the first polarization camera 910 or the second polarization camera 920 may further include a processor (e.g., a processor similar to the processor 130) coupled to the polarized image sensor and configured to process image data obtained by the polarized image sensor. At least one (e.g., each) of the first polarization camera 910 or the second polarization camera 920 may also include a memory (e.g., a memory similar to the memory 140) coupled to the processor 130 and configured to store computer-executable codes or instructions. In some embodiments, at least one of the polarization cameras 910 and 920 may not include a processor configured to process the image data. Instead, the image data obtained by the polarization cameras 910 and 920 may be transmitted or transferred to an external processor or computer for processing, such as for constructing the polarization color images, for determining (e.g., calculating) one or more polarization parameters, and/or for determining (e.g., calculating) the depth information.

At least one (e.g., each) of the polarized image sensor included in the polarization cameras 910 and 920 may include a microlens array (e.g., similar to the microlens array 1201) arranged at a top layer of the polarized image sensor, a pixel array (e.g., similar to the pixel array 1202) arranged on a bottom layer of the polarized image sensor, and a polarizer array (e.g., similar to the polarizer array 1203) and the color-filter array sandwiched between the microlens array and the pixel array, similar to the embodiment shown in FIG. 2. As described above, the polarizer array may include the plurality of polarizers associated with different polarization orientations arranged in a repeating pattern. The color filter array may include R, G, and B filters arranged in the Bayer filter pattern.

In some embodiments, the processor included in at least one of the polarization camera 910 or the polarization camera 920 may be configured to construct a plurality of polarization color images based on image data obtained in a plurality of polarization orientations, and determine (e.g., calculate) one or more polarization parameters based on the plurality of polarization color images. The processor included in at least one of the polarization camera 910 or polarization camera 920 may be further configured to calculate depth information of an object identified from image data. The processes of constructing the plurality of polarization color images and calculating the polarization parameters and the depth information may be similar to the processes implemented by the processor 130 shown in FIGS. 1A and 1B, which have been described above.

Consistent with the embodiments of the present disclosure, the polarization capture system 900 may obtain color, brightness, depth, and polarization parameters of an object included in an image based on the captured image data. The polarization parameters may be used to distinguish lights transmitted through the object from lights reflected and/or scattered from the object. Based on the polarization parameters, at least one of the following processes may be performed: 3-D reconstruction of the object, estimation of the texture and shape of the object, recognition of a transparent object, and distinguishing an artificial object from a natural one (even if the objects are in the same shape and color). The polarization capture system 900 may be implemented in a variety of devices, such as the mobile phones, AR/VR devices, vehicles, drones, detecting systems for various application in atmospheric science, remote sensing, facial recognition, eye-tracking, and machine vision.

Figure 10:
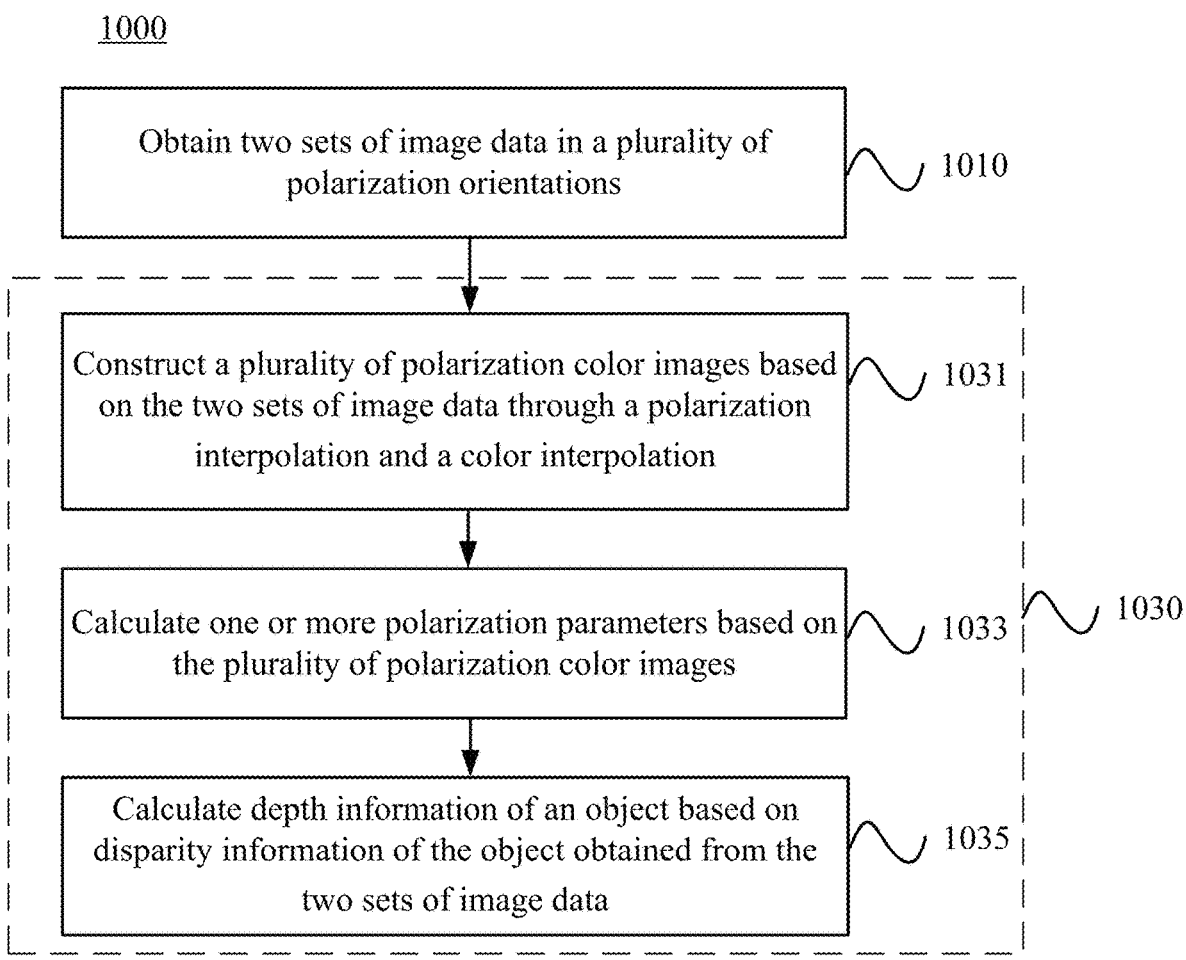
FIG. 10 is a flowchart illustrating a method for obtaining multi-modal data, according to an embodiment of the present disclosure.

FIG. 10 is a flowchart illustrating a method 1000 for obtaining multi-modal data consistent. The multi-modal data may include, for example, data of the plurality of polarization color images, the polarization parameters, and the depth information.

As shown in FIG. 10, method 1000 may include obtaining two sets of image data in a plurality of polarization orientations (step 1010). In some embodiments, the two sets of image data may be captured by the polarization cameras 910 and 920 in the polarization capture system 900 from different perspectives. In some embodiments, the two sets of image data may be captured by the polarization image sensors 120 and 121 included in the polarization capture device 100.

Method 1000 may include obtaining multi-model data from the two sets of image data (step 1030). Obtaining the multi-model data may be performed by the processor 130 included in the polarization capture device 100, the processor included in the polarization capture system 900, or an external processor (e.g., of a computer). Obtaining the multi-model data may include constructing a plurality of polarization color images based on the two sets of image data through a polarization interpolation and a color interpolation (step 1031). Since each pixel may only capture a single color value (either R, G, or B value) in only a single polarization orientation of the plurality of polarization orientations, polarization and color interpolation algorithms may be used to obtain the missing color values in the other polarization orientations based on the color values from one or more neighboring pixels. As such, polarization image data corresponding to each polarization orientation may be obtained. The interpolation algorithms may include, but not be limited to, nearest neighbor, bilinear, bicubic, bicubic spline, gradient-based, residual interpolation, Newton's polynomial interpolation algorithms, and the like. The plurality of polarization color images may be constructed from the corresponding polarization image data using color interpolation. Step 1031 may be similar to the processes shown in FIGS. 5A and 5B.

Obtaining the multi-model data may further include calculating one or more polarization parameters based on the plurality of polarization color images (step 1033). The polarization parameters may include one or more of Stokes parameters S0, S1, and S2. The polarization parameters may also include DOLP values and/or AOLP values. Step 1033 may be similar to the polarization parameters calculation processes implemented by the processor 130, as described above.

Obtaining the multi-model data may further include calculating depth information of an object based on disparity information of the object obtained from the two sets of image data (step 1035). In some embodiments, the two sets of image data may be captured by the polarization image sensors 120 and 121 included in the polarization capture device 100 or by the polarization cameras 910 and 920 included in the polarization capture system 900 from different perspectives. Step 1035 may be similar to the processes shown in FIG. 8, as described above.

In the disclosed embodiments, the depth information and polarization information of the object may be obtained based on at least two polarization images captured from slightly different perspectives of the object. To achieve the slightly different perspectives, the polarization cameras 910 and 920 may be configured to aim at the object from two slightly different directions (e.g., the aiming directions may form an angle within a range of 1°-10°, or 1°-15°, 1°-5°, 5°-10°, or 10°-15°, etc.). Based on the obtained depth information and polarization information, other parameters in addition to polarization parameters may be calculated. For example, a surface normal of the object may be calculated based on the obtained depth information of the object. Further, a polarization scatter function of the object may be a function of polarization dependent reflection, transmission, and scatter distribution of the object. For example, various models of polarimetric bi-directional distribution function ("pBRDF") may be a function of normal at the surface location (e.g., surface normal), roughness of the surface, spatial frequency of the roughness, the index of refraction and conductivity (e.g., absorption) of the surface, and/or diffraction from periodic behavior of the surface. Based on the two polarization images captured from slightly different perspectives of the object and the surface normal estimated from the depth of the object, various parameters in the pBRDF may be calculated. Accordingly, more information about the object may be provided.

Stereo polarization capture devices, systems and/or methods in accordance with various embodiments of the present disclosure have various applications in a number of fields, which are all within the scope of the present disclosure. For example, such polarization capture devices or systems may be implemented in other systems for target detection and identification, materials inspection, stress inspection and visualization, defects detection, image contrast enhancement, transparent objects detection, surface reflection reduction, depth mapping, 3D surface reconstruction, robotic vision, biology, etc. Some exemplary implementations of the polarization capture devices or systems in near-eye displays ("NEDs") will be explained below. NEDs have been widely used in a large variety of applications, such as aviation, engineering, science, medicine, computer gaming, video, sports, training, and simulations. One application of NEDs is to realize augmented reality ("AR"), virtual reality ("VR"), mixed reality ("MR"), or a combination thereof.

Figure 11A:
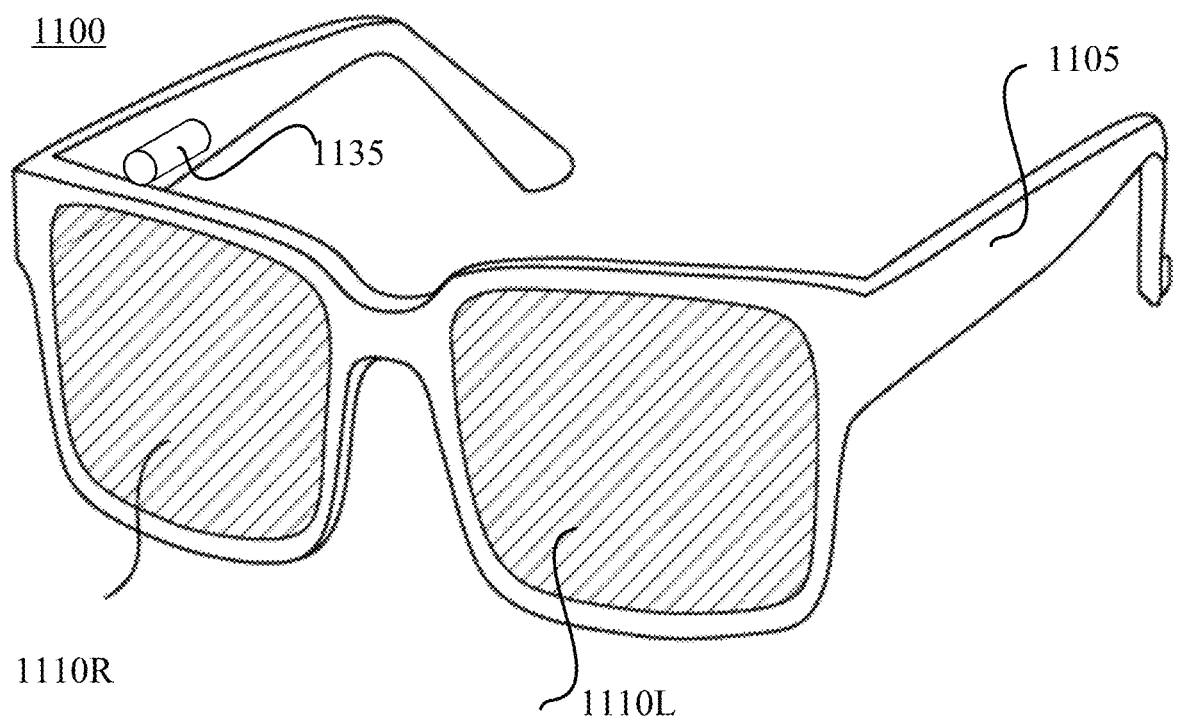
FIG. 11A illustrates a schematic diagram of a near-eye display ("NED") including a polarization capture device, according to an embodiment of the present disclosure.

FIG. 11A illustrates a schematic diagram of an NED 1100 according to an embodiment of the disclosure. In some embodiments, the NED 1100 may be referred to as a head-mounted display ("HMD"). The NED 1100 may be configured to present media content to a user. Examples of media content presented by the NED 1100 may include one or more images, video, audio, or a combination thereof. In some embodiments, audio is presented via an external device (e.g., speakers and/or headphones). The NED 1100 may function as a VR device, an AR device, an MR device, or a combination thereof. In some embodiments, when the NED 1100 may function as an AR or an MR device, portions of the NED 1100 and its internal components may be at least partially transparent.

As shown in FIG. 11A, the NED 1100 may include a frame 1110, a left display system 1120L, and a right display system 1120R. In some embodiments, one or more devices shown in FIG. 11A may be omitted. In some embodiments, one or more additional devices or components not shown in FIG. 11A may also be included in the NED 1100. The frame 1110 may include a suitable type of mounting structure configured to mount the left display system 1120L and the right display system 1120R to a body part (e.g. a head) of the user (e.g., adjacent eyes of the user). The frame 1110 may be coupled to one or more optical elements, which may be configured to display media content to the user. In some embodiments, the frame 1110 may represent a frame of eye-wear glasses. The left display system 1120L and the right display system 1120R may be configured to enable the user to view virtual content presented by the NED 1100 and/or to view images of real-world objects. For example, in some embodiments, each of the left display system 1120L and the right display system 1120R may include a see-through optical element. In some embodiments, the left display system 1120L and the right display system 1120R may include any suitable display assembly (not shown) configured to generate an image light (representing a virtual image) and to direct the image light to an eye of the user. In some embodiments, the left display system 1120L and the right display system 1120R may each include a light source assembly 1135 configured to generate a virtual image (or an image light).

Figure 11B:
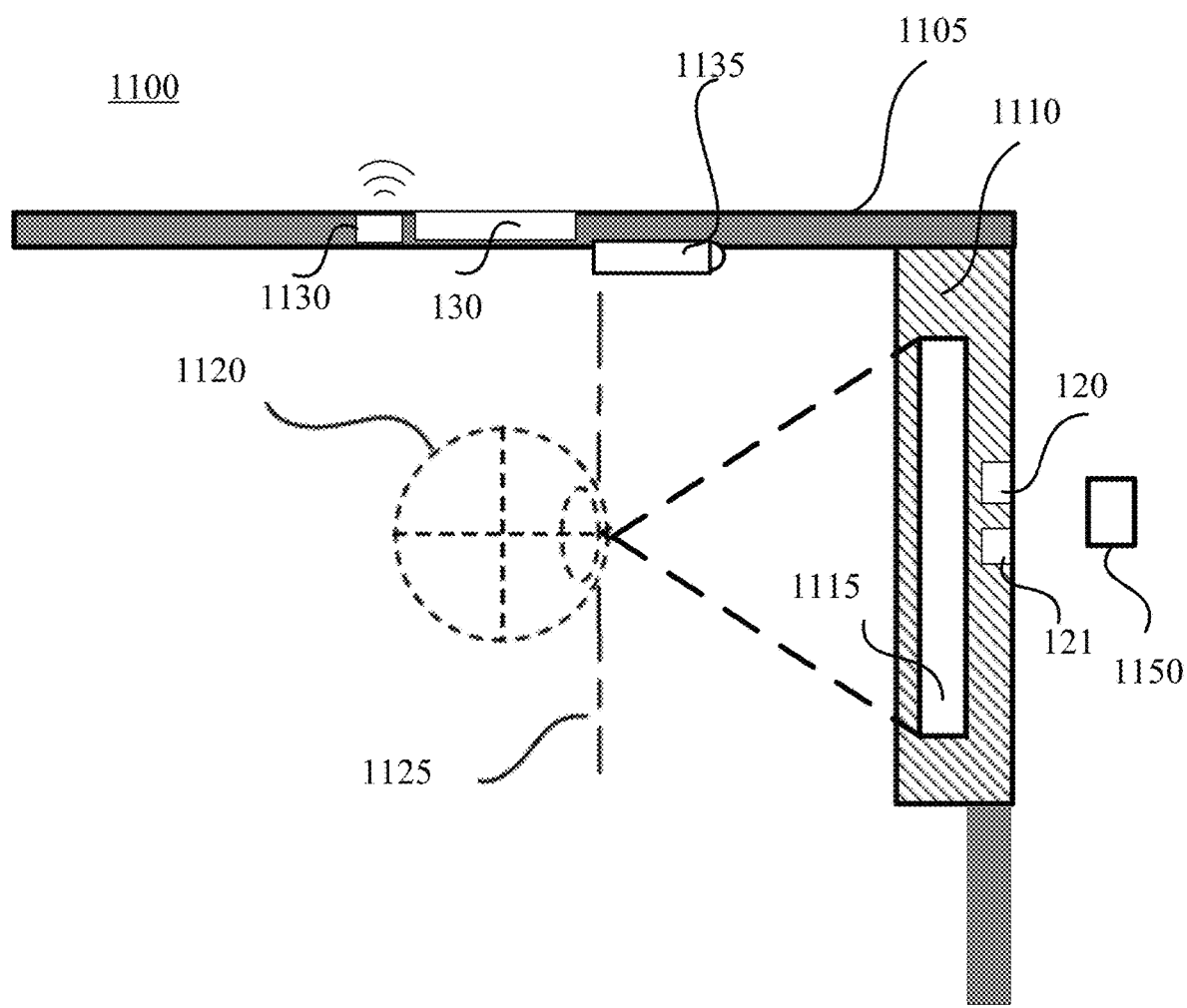
FIG. 11B illustrates a schematic diagram of a cross section view of a half of the NED shown in FIG. 11A, according to an embodiment of the present disclosure.

FIG. 11B is a cross-section view of a half of the NED 1100 shown in FIG. 11A according to an embodiment of the disclosure. For purposes of illustration, FIG. 11B shows the cross-sectional view associated with the left display system 1120L of the NED 1100. The cross-sectional view of the right display system 1120R may be similar to the cross-sectional view associated with the left display system 1120L. As shown in FIG. 11B, for an eye 1120, the left display system 1120L may include the light source assembly 1135 for generating an image light (e.g., a visible image light representing a virtual image) and a light guide (or waveguide) display assembly 1115 for delivering the image light generated by the light source assembly 1135 to the eye 1120. An exit pupil 1125 may be a location where the eye 1120 is positioned in an eye-box region when the user wears the NED 1100.

In some embodiment, the light source assembly 1135 may include a light source (e.g., a projector) configured to emit the image light and an optical conditioning device configured to condition (e.g., including collimating, polarizing, etc.) the image light. In some embodiments, the light guide display assembly 1115 may include a light guide or a stack of light guides. The light guide display assembly 1115 may also include one or more in-coupling elements coupled to the light guide(s) and configured to couple the image light generated by the light source assembly 1135 into a total internal reflection ("TIR") path inside the light guide(s). The light guide display assembly 1115 may also include one or more out-coupling elements coupled to the light guide(s) and configured to couple the image light propagating in the TIR path out of the light guide(s), toward the eye 1120. For illustrative purposes, FIG. 11B shows the cross-sectional view associated with a single eye 1120 and a single light guide display assembly 1115. In some embodiments, another light guide display assembly that is separate from and similar to the light guide display assembly 1115 shown in FIG. 11B may be included in the NED 1100 to provide an image light to an exit pupil of another eye of the user. In some embodiments, a light source assembly similar to the light source assembly 1135 may be disposed at the other half of the NED 1100.

The NED 1100 may include one or more optical elements between the light guide display assembly 1115 and the eye 1120. The optical elements may be configured to, e.g., correct aberrations in an image light emitted from the light guide display assembly 1115, magnify an image light emitted from the light guide display assembly 1115, or perform another type of optical adjustment to an image light emitted from the light guide display assembly 1115. The NED 1100 may include a polarization capture device or system in accordance with an embodiment of the present disclosure, such as the polarization capture device or system 100 shown in FIGS. 1A and 1B. The polarization capture device or system may include two or more polarized image sensors (e.g., the first polarized image sensor 120 and the second polarized image sensor 121), a communication device 1130, a processor (e.g., the processor 130), and a storage device (not shown in FIG. 11B). In some embodiments, the polarization cameras or polarized image sensors 120 and 121 may be disposed at a side of the light guide display assembly 1115 facing an object 1150 in the real world. The polarized image sensors 120 and 121 may be configured to capture two or more images (i.e., image data representing the two or more images) of the object 1150 or a scene including the object 1150 from two or more different perspectives. The processor 130 may process the captured image data to obtain the color information, polarization information, and/or depth information of the object 1150. Based on the color information, polarization information, and/or depth information of the object 1150, the processor 130 may exact various features or characteristics (e.g., material, shape, etc.) of the object 1150, identify various properties of an object 1150, and/or determine an operation state of the object. Information of the object 1150, e.g., regarding the extracted or identified features (including various properties of the material of the object 1150) and/or determined operation state of the object 1150, may be presented to the user via the display system 1110L. For example, the information relating to the object 1150 obtained by the processor 130 may be transmitted to the light source assembly 1135, which may generate an image light including a presentation of the information relating to the object 1150. The image light including the presentation of the information relating to the object 1150 may be displayed to the eye 1120 through the light guide display assembly 1115. In some embodiments, the presentation of the information relating to the object 1150 may be superimposed on an image of the object 1150, and both of the image of the object 1150 and the presentation of the information may be presented to the eye 1120. Therefore, the eye 1120 may view both an image of the object 1150 in the real world, and information relating to the object 1150 extracted by the processor 130 based on image data obtained by the polarized image sensors 120 and 121.

Figure 12:
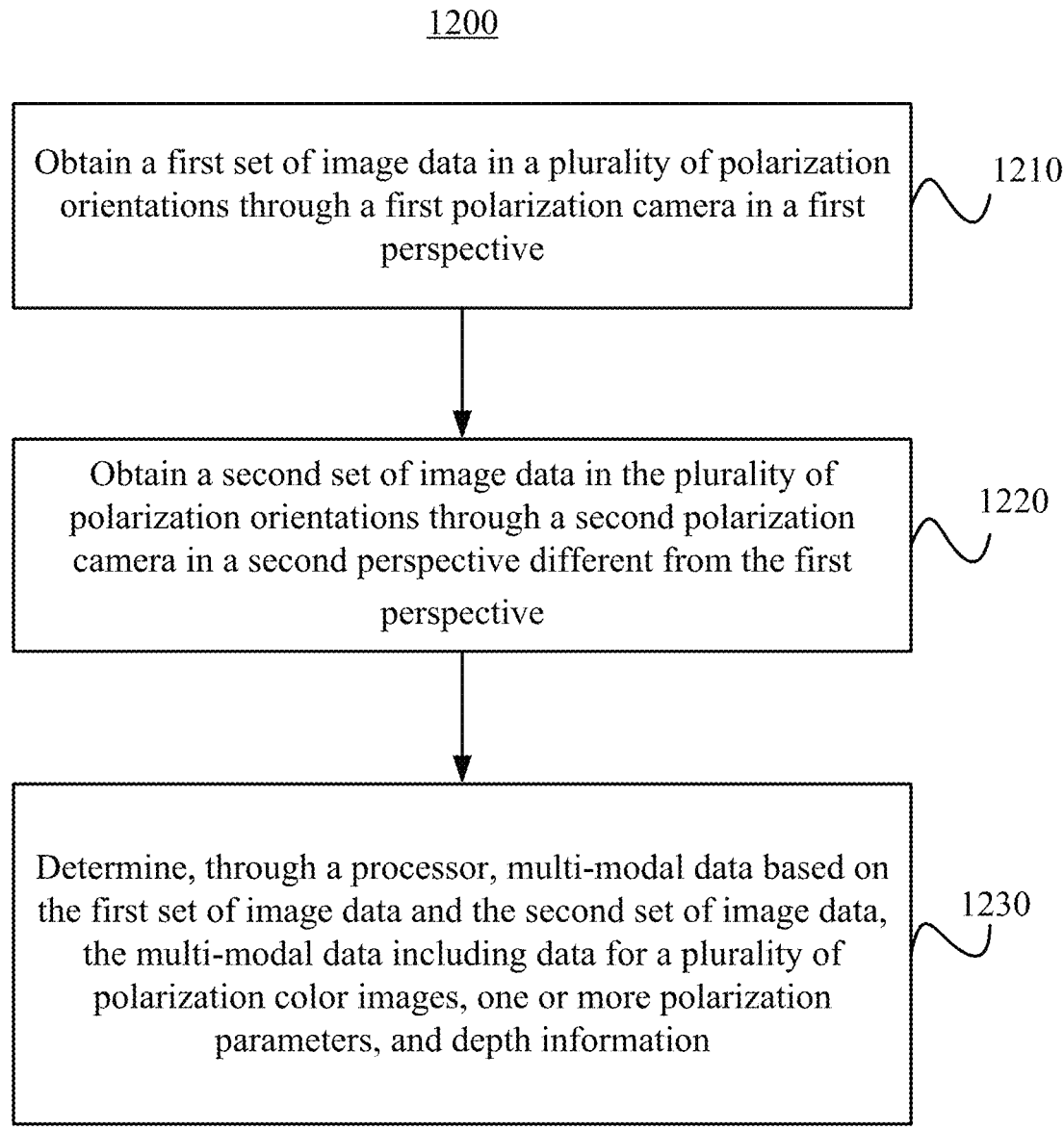
FIG. 12 is a flowchart illustrating a method according to an embodiment of the present disclosure.

FIG. 12 is a flowchart illustrating a method 1200 according to an embodiment of the present disclosure. The method 1200 may include obtaining a first set of image data in a plurality of polarization orientations through a first polarization camera in a first perspective (step 1210). The method 1200 may also include obtaining a second set of image data in the plurality of polarization orientations through a second polarization camera in a second perspective different from the first perspective (step 1220). The method 1200 may further include determining, through a processor, multi-modal data based on the first set of image data and the second set of image data, the multi-modal data including data for a plurality of polarization color images, one or more polarization parameters, and depth information (step 1230). Various calculations or computations may be performed by the processor to determine the multi-modal data based on the first set of image data and the second set of image data. The method 1200 may include other steps not shown in FIG. 12. For example, the method 1200 may include constructing, through the processor, a polarization color image of the plurality of polarization color images based on at least one of the first set of image data or the second set of image data through a polarization interpolation and a color interpolation. In some embodiments, the method 1200 may include determining, through the processor, the one or more polarization parameters based on the polarization color image, the one or more polarization parameters including one or more of a Stokes parameter, a degree of linear polarization ("DOLP"), and an angle of linear polarization ("AOLP"). In some embodiments, the method 1200 may include determining a DOLP value for each pixel based on one or more Stokes parameters. In some embodiments, the method 1200 may include determining an AOLP value for each pixel based on the one or more Stokes parameters. In some embodiments, the method 1200 may include determining, through the processor, depth information of an object based on a disparity of the object in the first set of image data and the second set of image data.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive. The disclosed embodiments described in the specification and/or shown in the drawings be combined in any suitable manner. For example, elements shown in one embodiment (e.g., in one figure) but not another embodiment (e.g., in another figure) may nevertheless be included in the other embodiment. Elements shown in one embodiment (e.g., in one figure) may be repeated to form a stacked configuration. Elements shown in different embodiments (e.g., in different figures) may be combined to form a variation of the disclosed embodiments. Elements shown in different embodiments may be repeated and combined to form variations of the disclosed embodiments. Elements mentioned in the descriptions but not shown in the figures may still be included in a disclosed embodiment or a variation of the disclosed embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a first lens;
a first polarized image sensor coupled with the first lens and configured to capture, from a first perspective, a first set of image data in a plurality of polarization orientations;
a second lens disposed apart from the first lens; and
a second polarized image sensor coupled with the second lens and configured to capture, from a second perspective different from the first perspective, a second set of image data in the plurality of polarization orientations,
wherein each of the first set of image data and the second set of image data includes an image data array, and
wherein the device further comprises a processor configured to perform data processing on each of the first set of image data and the second set of image data, the data processing including:
for each image data array, applying a polarization interpolation to obtain a plurality of polarization image data arrays, each of the plurality of polarization image data arrays associated with a predetermined polarization orientation of the plurality of polarization orientations and a plurality of colors; and
for each of the plurality of polarization image data arrays associated with the predetermined polarization orientation and the plurality of colors, applying a plurality of color interpolations to construct a plurality of polarization color images each associated with the same predetermined polarization orientation and one of the plurality of colors.

2. The device of claim 1, wherein at least one of the first polarized image sensor or the second polarized sensor comprises:
a microlens array;
a pixel array coupled with the microlens array; and
a polarizer array disposed between the microlens array and the pixel array.

3. The device of claim 2, wherein the polarizer array comprises a plurality of polarizers having different transmission axis orientations arranged in a predetermined pattern.

4. The device of claim 3, wherein:
the plurality of polarizers comprise one or more arrays, each array comprising:
a linear horizontal polarizer configured to allow a light having a horizontal polarization orientation to transmit through;
a linear vertical polarizer configured to allow a light having a vertical polarization orientation to transmit through;
a linear 45-degree polarizer configured to allow a light having a 45° polarization orientation to transmit through; and
a linear 135-degree polarizer configured to allow a light having a 135° polarization orientation to transmit through.

5. The device of claim 2, wherein at least one of the first polarized image sensor or the second polarized sensor further comprises:

a color filter array disposed between the microlens array and the pixel array and including a plurality of color filters arranged in a predetermined color filter pattern.

6. The device of claim 5, wherein:
the plurality of color filters comprise at least one of a red color filter, a green color filter, or a blue color filter, and
the predetermined color filter pattern is a Bayer filter pattern.

7. The device of claim 1, wherein the processor is further configured to:
determine one or more polarization parameters based on the plurality of polarization color images, the one or more polarization parameters including one or more of a Stokes parameter, a degree of linear polarization ("DOLP"), and an angle of linear polarization ("AOLP").

8. The device of claim 7, wherein the processor is further configured to:
determine one or more Stokes parameters based on optical powers of one or more lights corresponding to one or more of the plurality of polarization orientations.

9. The device of claim 8, wherein the processor is further configured to:
determine a DOLP value for each pixel based on the one or more Stokes parameters; and
determine an AOLP value for each pixel based on the one or more Stokes parameters.

10. The device of claim 1, wherein the processor is further configured to:
determine depth information of an object based on the first set of image data and the second set of image data.

11. A system, comprising:
a first polarization camera configured to capture a first set of image data from a first perspective in a plurality of polarization orientations; and
a second polarization camera configured to capture a second set of image data from a second perspective different from the first perspective in the plurality of polarization orientations,
wherein each of the first set of image data and the second set of image data includes an image data array, and
wherein at least one of the first polarization camera or the second polarization camera further a processor configured to perform data processing on each of the first set of image data and the second set of image data, the data processing including:
for each image data array, applying a polarization interpolation to obtain a plurality of polarization image data arrays, each of the plurality of polarization image data arrays associated with a predetermined polarization orientation of the plurality of polarization orientations and a plurality of colors; and
for each of the plurality of polarization image data arrays associated with the predetermined polarization orientation and the plurality of colors, applying a plurality of color interpolations to construct a plurality of polarization color images each associated with the same predetermined polarization orientation and one of the plurality of colors.

12. The system of claim 11, wherein at least one of the first polarization camera or the second polarization camera comprises:
a lens; and
a polarized image sensor optically coupled to the lens.

13. The system of claim 12, wherein the polarized image sensor comprises:

a microlens array;
a pixel array coupled with the microlens array;
a color filter array disposed between the microlens array and the pixel array and including a plurality of color filters arranged in a predetermined color filter pattern; and
a polarizer array disposed between the microlens array and the color filter array, and including a plurality of polarizers associated with different polarization orientations arranged in a predetermined pattern.

14. The system of claim 11, wherein the processor is further configured to:
determine one or more polarization parameters based on the plurality of polarization color images, the one or more polarization parameters including one or more of a Stokes parameter, a degree of linear polarization ("DOLP"), and an angle of linear polarization ("AOLP").

15. The system of claim 14, wherein when the processor is also configured to:
determine depth information of an object based on a disparity of the object in the first set of image data and the second set of image data.

16. A method, comprising:
obtaining a first set of image data in a plurality of polarization orientations through a first polarization camera in a first perspective;
obtaining a second set of image data in the plurality of polarization orientations through a second polarization camera in a second perspective different from the first perspective; and
determining, through a processor, multi-modal data based on the first set of image data and the second set of image data, the multi-modal data comprising data for a plurality of polarization color images, one or more polarization parameters, and depth information,
wherein each of the first set of image data and the second set of image data includes an image data array, and
wherein determining the multi-modal data comprises:
for each image data array, applying, through the processor, a polarization interpolation to obtain a plurality of polarization image data arrays, each of the plurality of polarization image data arrays associated with a predetermined polarization orientation of the plurality of polarization orientations and a plurality of colors; and
for each of the plurality of polarization image data arrays associated with the predetermined polarization orientation and the plurality of colors, applying, through the processor, a plurality of color interpolations to construct a plurality of polarization color images each associated with the same predetermined polarization orientation and one of the plurality of colors.

17. The method of claim 16, wherein obtaining the multi-modal data comprises:
determining, through the processor, the one or more polarization parameters based on the plurality of polarization color images, the one or more polarization parameters including one or more of a Stokes parameter, a degree of linear polarization ("DOLP"), and an angle of linear polarization ("AOLP").

18. The method of claim 17, wherein obtaining the multi-modal data comprises:
determining, through the processor, a DOLP value for each pixel based on one or more Stokes parameters; and determining, through the processor, an AOLP value for each pixel based on the one or more Stokes parameters.

19. The method of claim 16, wherein obtaining the multi-modal data further comprises:

determining, through the processor, depth information of an object based on a disparity of the object in the first set of image data and the second set of image data.

* * * * *